(12) United States Patent
Inoue et al.

(10) Patent No.: US 12,703,319 B2
(45) Date of Patent: Aug. 11, 2026

(54) VEHICLE SEAT

(71) Applicant: TS TECH CO., LTD., Asaka (JP)

(72) Inventors: Kazuya Inoue, Shioya-gun (JP); Hiromi Taniguchi, Shioya-gun (JP); Hiroyuki Nomura, Shioya-gun (JP); Hidetaka Yonehara, Shioya-gun (JP); Masaki Tanaka, Shioya-gun (JP); Yoshiaki Ito, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 187 days.

(21) Appl. No.: 18/838,669

(22) PCT Filed: May 19, 2023

(86) PCT No.: PCT/JP2023/018844

§ 371 (c)(1),
(2) Date: Aug. 15, 2024

(87) PCT Pub. No.: WO2023/224130

PCT Pub. Date: Nov. 23, 2023

(65) Prior Publication Data

US 2025/0236256 A1 Jul. 24, 2025

Related U.S. Application Data

(60) Provisional application No. 63/365,035, filed on May 20, 2022.

(51) Int. Cl.
*B60N 2/20* (2006.01)
*A47C 1/02* (2006.01)
(Continued)

(52) U.S. Cl.
CPC .... *B60R 22/023* (2013.01); *B60R 2022/1831* (2013.01)

(58) Field of Classification Search
CPC . B60R 22/26; B60R 2022/1818; B60R 22/20; B60N 2/688
(Continued)

(56) References Cited

U.S. PATENT DOCUMENTS 4,191,399 A * 3/1980 Garvey .................. B60R 22/26 296/68.1
5,544,917 A * 8/1996 Loxton .................. B60R 22/26 280/808
(Continued)

FOREIGN PATENT DOCUMENTS

JP 2009-90963 A 4/2009
JP 2009-262725 A 11/2009
(Continued)

OTHER PUBLICATIONS

International Search Report (with English translation) received in corresponding Application No. PCT/JP2023/018844, dated Jul. 25, 2023, 6 pages.

*Primary Examiner* — Shin H Kim
(74) *Attorney, Agent, or Firm* — Dority & Manning, P.A.

(57) ABSTRACT

The vehicle seat includes a seat frame, a belt guide attached to the seat frame, and a coupling member coupling the belt guide to the seat frame. The seat frame is provided with a first locking portion extending in a first direction, and the belt guide is provided with a first receiving hole extending in the first direction and through which the first locking portion passing, and a second receiving hole extending in a second direction orthogonal to the first direction and receiving a part of the coupling member. The coupling member received in the second receiving hole engages the first locking portion passing through the first receiving hole.

10 Claims, 24 Drawing Sheets

(51) Int. Cl.
*B60N 2/68* (2006.01)
*B60R 22/02* (2006.01)
*B60R 22/18* (2006.01)

(58) Field of Classification Search
USPC .......................................... 297/473, 481, 482
See application file for complete search history.

(56) References Cited

U.S. PATENT DOCUMENTS

| | | | | |
|---|---|---|---|---|
| 5,658,051 A * | 8/1997 | Vega | B60R 22/26 | 297/483 |
| 6,520,588 B1 * | 2/2003 | Busch | B60R 22/26 | 297/483 |
| 6,601,923 B2 * | 8/2003 | Pond | B60N 2/24 | 297/483 |
| 6,817,672 B2 * | 11/2004 | Matsunuma | B60N 2/688 | 297/483 |
| 7,618,097 B2 * | 11/2009 | Ghatge | B60R 22/26 | 297/473 |
| 8,240,736 B2 * | 8/2012 | Coenen | B60R 22/26 | 296/65.01 |
| 9,725,067 B2 * | 8/2017 | Shenaq | B60R 22/26 | |
| 10,086,723 B1 * | 10/2018 | Watanabe | B60N 2/688 | |
| 10,086,792 B1 * | 10/2018 | Watanabe | B60N 2/688 | |
| 10,196,033 B2 * | 2/2019 | Loew | B60R 22/20 | |
| 10,933,784 B2 * | 3/2021 | Yilma | B60N 2/6009 | |
| 12,208,716 B2 * | 1/2025 | Line | B60N 2/682 | |
| 2003/0020272 A1 * | 1/2003 | Yoshino | B60R 22/20 | 280/808 |
| 2008/0012417 A1 * | 1/2008 | Okazaki | B60R 22/26 | 297/468 |
| 2008/0100051 A1 * | 5/2008 | Bell | B60R 22/20 | 280/801.1 |
| 2008/0309111 A1 * | 12/2008 | Marriott | B60N 2/688 | 280/808 |
| 2009/0008983 A1 * | 1/2009 | Ghatge | B60R 22/26 | 297/468 |
| 2010/0127553 A1 * | 5/2010 | Surgeon | B60N 2/265 | 297/475 |
| 2014/0232162 A1 * | 8/2014 | Mitsuhashi | B60N 2/68 | 297/452.18 |
| 2015/0266448 A1 * | 9/2015 | Aoki | B60N 2/688 | 297/354.1 |
| 2019/0092201 A1 * | 3/2019 | Hasegawa | B60N 2/2893 | |
| 2019/0202396 A1 * | 7/2019 | Kaltschmidt | B60R 22/26 | |
| 2020/0331371 A1 * | 10/2020 | Yilma | B60R 22/18 | |
| 2025/0145067 A1 * | 5/2025 | Kim | B60N 2/688 | |
| 2025/0236256 A1 * | 7/2025 | Inoue | B60N 2/42 | |

FOREIGN PATENT DOCUMENTS

| | | |
|---|---|---|
| JP | 2018-100040 A | 6/2018 |
| JP | 2019-14459 A | 1/2019 |
| JP | H 11-301404 A | 11/2019 |
| KR | 10-2006-0038183 A | 5/2006 |
| KR | 10-2020-0058188 A | 5/2020 |
| KR | 10-2276256 B1 | 7/2021 |

* cited by examiner

Fig.2

13
32
31
43B
43
20
61
62
64A
24
45
43A
35
22
64
27
26
22A
22B
36
67
41
22
27
42A
42B
42
7
up
left
front
down
rear
right

Fig.13

XIX
242
XVIII
207C
241
207
XVII
242
244
246
213
251
225
XVII
XIX
XVIII
221
rear
left
up
down
right
front up
rear
right
left
front
down
244
241
213
242
242
246
251
238
231
238
225
221
228
228A
228B
228
227
227
207A
207E
207D
207A
207C
224
207F
207B
207C
207

227
225
236
228B
228A
233
227
234B
234
228
231
221
228
234A 207F
207D
207E
207C
207
209
242
209A
255
241
213
244
261
246
221
227
236
224
238
225
231
247
249
207B
228
228B
228A
up
down
rear
front 209
221
213
253B
253
253A
209A
207C
207
241
227
253C
228
246
207E
207F
261
236
251
207B
261
224
207D
228
231
227
207C
253
225
242
up
down
left
right 221
213
241
234A
207B
234
227
234B
207C
207
238
233
207E
255
207F
236
224
207D
238
255
207B
227
207C
225
242
up
down
left
right 301
303
307
305
306
305
308
304
302
rear
left
up
down
right
front 336B
336
336A
336A
341
331
340
344
343
334
331A
347
332
331
340
343
334
331A

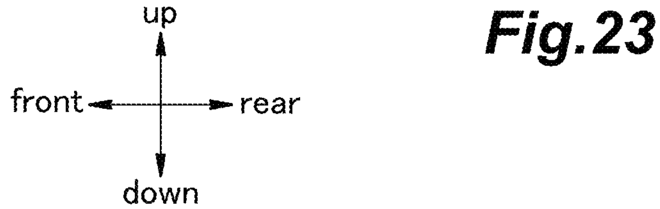
*Fig.23*
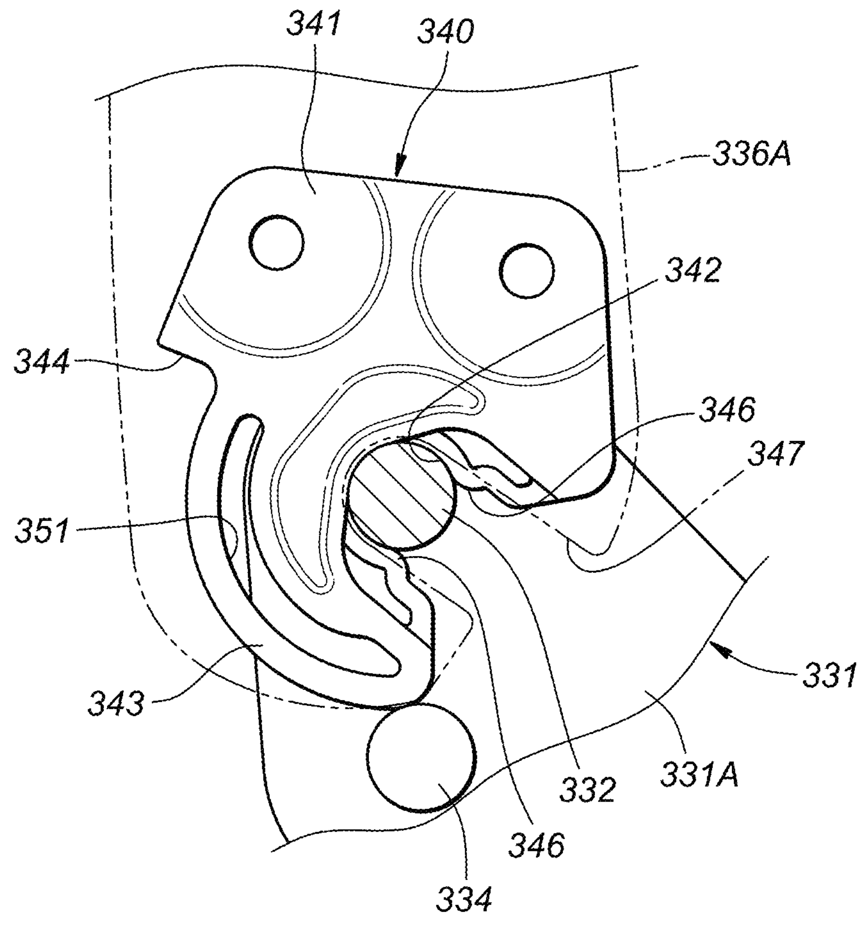

VEHICLE SEAT

CROSS-REFERENCE TO RELATED APPLICATIONS

This application is the U.S. National Stage entry of International Application No. PCT/JP2023/018844, filed on May 19, 2023, which, in turn, claims priority to U.S. Provisional Patent Application No. 63/365,035, filed on May 20, 2022, both of which are hereby incorporated herein by reference in their entireties for all purposes.

TECHNICAL FIELD

The present invention relates to a vehicle seat.

BACKGROUND ART

Patent Document 1 discloses a vehicle seat having a belt guide for regulating the position of a seat belt. The belt guide includes a cover member having an opening through which the seat belt passes. To withstand the load received from the seat belt, the cover member is fixed to the frame with tapping screws.

PRIOR ART DOCUMENT(S)

Patent Document(s)

Patent Document 1: JP2018-100040A

SUMMARY OF THE INVENTION

Task to be Accomplished by the Present Invention

When tapping screws are used, a tool required to attach the belt guide so that work efficiency is impaired.

In view of this background, a primary object of the present invention is to allow a belt guide to be fixed to a seat frame in a vehicle seat without using a tool.

Means to Accomplish the Task

To accomplish such a task, the present invention provides a vehicle seat, comprising: a seat frame (7); a belt guide (13) attached to the seat frame, and a coupling member (20) coupling the belt guide to the seat frame, wherein the seat frame is provided with a first locking portion (22) extending in a first direction, and the belt guide is provided with a first receiving hole (41) extending in the first direction and through which the first locking portion passes, and a second receiving hole (42) extending in a second direction orthogonal to the first direction and receiving a part of the coupling member, the coupling member received in the second receiving hole being engaging the first locking portion passing through the first receiving hole.

According to this aspect of the present invention, in a vehicle seat, the belt guide can be fixed to the seat frame without using a tool. The first direction, in which the first locking portion is inserted into the first receiving hole, and the second direction, in which the coupling member is inserted into the second receiving hole, are orthogonal to each other. Therefore, even if a load is applied to the first locking portion in the direction of coming out of the first receiving hole, no load is applied to the coupling member in the direction of coming out of the second receiving hole. Therefore, the belt guide is fixed to the seat frame in a highly stable manner.

In this aspect of the present invention, preferably, the seat frame is provided with a plate portion (24) extending along a plane orthogonal to the first direction, a tip end portion of the first locking portion extends in a direction orthogonal to both the first direction and the second direction, and a surface of the tip end portion of the first locking portion facing the plate portion abuts against an abutting piece (64) of the coupling member.

According to this aspect of the present invention, the coupling member inserted into the second receiving hole can lock the first locking portion.

In this aspect of the present invention, preferably, the abutting piece extends in the second direction inside the second receiving hole.

According to this aspect of the present invention, by inserting the coupling member into the second receiving hole, the first locking portion can be locked by the abutting piece.

In this aspect of the present invention, preferably, the coupling member is provided with an elastic claw (63) that is deflectable in the first direction, and the belt guide is provided with a second locking portion (67) that locks the elastic claw and restricts movement of the coupling member in the second direction.

According to this aspect of the present invention, the coupling member is prevented from being dislodged from the belt guide.

In this aspect of the present invention, preferably, the second locking portion is formed inside the second receiving hole.

According to this aspect of the present invention, the elastic claw and the second locking portion can be concealed inside the belt guide.

In this aspect of the present invention, preferably, the belt guide includes a leg portion (31) extending along the plate portion, a guide portion (32) connected to the leg portion and allowing the seat belt to pass therethrough, and a first projection (51) protruding from the leg portion toward the plate portion, and the plate portion is provided with a first positioning hole (26) for receiving the first projection.

According to this aspect of the present invention, the belt guide is prevented from rotating around the first locking portion.

In this aspect of the present invention, preferably, the first receiving hole and the second receiving hole are formed in the leg portion, and an outer surface of the coupling member and an outer surface of the leg portion jointly form a continuous outer surface.

According to this aspect of the present invention, the seat belt is prevented from being snagged by the coupling member.

In this aspect of the present invention, preferably, a second positioning hole (27) is formed in the plate portion, the first locking portion is a plate piece that is cut and raised to form the second positioning hole, and the leg portion is provided with a plurality of second projections (52) abutting against an edge of the second positioning hole.

According to this aspect of the present invention, the belt guide is prevented from rotating around the first locking portion.

In this aspect of the present invention, preferably, the second projections include a pair of second projections arranged at intervals along the second direction, and the first locking portion is positioned between the second projections along the second direction.

According to this aspect of the present invention, the belt guide is prevented from rotating around the first locking portion.

In this aspect of the present invention, preferably, a skin material is placed along a surface of the plate portion, a part of the skin material is clamped between the plate portion and the leg portion, and the first locking portion and the first projection penetrate the skin material.

According to this aspect of the present invention, the belt guide can be positioned on the outer surface of the skin material.

Another aspect of the present invention provides a vehicle seat (201) comprising: a seat frame (207) having a pair of first portions (207A) extending in a fore and aft direction on either side, and a second portion (207B) extending laterally and connected to front ends of the first portions; a base member (221) having a plate portion (225) provided with a first belt hole (231) through which a seat belt (211) passes, a pair of first locking portions (227) protruding downward from the plate portion and locking the first portions, respectively, and a second locking portion (228) protruding downward from the plate portion and abutting against a front and a lower end of the second portion; and a belt guide (220) having a main body portion (241) positioned opposite to the plate portion and provided with a second belt hole (244) through which the seat belt passes, a plurality of locking claws (253) protruding downward from the main body portion and locking the plate portion, and an edge wall (247) extending from an edge of the second belt hole into the first belt hole, wherein the second portion is positioned between the second locking portion and the main body portion with respect to a vertical direction and between the second locking portion and the edge wall with respect to the fore and aft direction.

According to this aspect of the present invention, in a vehicle seat, the belt guide can be fixed to the seat frame without using a tool. The coupling of the belt guide to the base member causes the second portion of the seat frame to be positioned between the base member and the belt guide. Thereby, movement of the base member and the belt guide with respect to the seat frame is restricted in the fore and aft direction and vertical direction. Movement of the base member and the belt guide with respect to the seat frame in the lateral direction is restricted by engagement between the first locking portions and the first portions.

In the above aspect of the present invention, preferably, the belt guide includes a restricting wall (261) extending from the plate portion into the first belt hole, and the restricting wall abuts against a front end of the second portion.

According to this aspect of the present invention, by the restriction wall and the edge wall coming into contact with the second portion, movement of the base member and the belt guide relative to the seat frame in the fore and aft direction is restricted.

In the above aspect of the present invention, preferably, one of the locking claws is locked to a left edge of the first belt hole, and another one of the locking claws is locked to a right edge of the first belt hole.

According to this aspect of the present invention, the belt guide can be coupled to the base member by making use of the first belt hole.

In the above aspect of the present invention, preferably, the base member is provided with a positioning hole (238) formed in the plate portion thereof, and the belt guide is provided with a positioning projection (255) extending downward from the main body part and fitted into the positioning hole.

According to this aspect of the present invention, the belt guide can be coupled to the base member.

In the above aspect of the present invention, preferably, the seat frame includes a pair of third portions (207C) extending downward from rear ends of the first portions, respectively, and a fourth portion (207D) extending laterally and coupled to the left and right third portions, the fourth portion is provided with a locking hole (224) penetrating the fourth portion in the fore and aft direction, and the base member is provided with a third locking portion (236) extending downward from the plate portion and engaged by the locking hole.

According to this aspect of the present invention, vertical movement of a rear part of the base member relative to the seat frame can be restricted.

In the above aspect of the present invention, preferably, a plurality of ribs (249) are provided on the edge wall, and the second portion is clamped between the second locking portion and the ribs in the fore and aft direction.

According to this aspect of the present invention, the edge wall can be brought into contact with the second portion of the seat frame via the ribs in a reliable manner.

In the above aspect of the present invention, preferably, the second portion is clamped between the second locking portion and the main body portion in the vertical direction.

According to this aspect of the present invention, the base member and the belt guide can be fixed to the second portion without rattling.

In the above aspect of the present invention, preferably, a skin material (209) is placed on a surface of the plate portion, and a part of the skin material is clamped between the plate portion and the belt guide.

According to this aspect of the present invention, the belt guide can be positioned on the outer surface of the skin material.

In the above aspect of the present invention, preferably, the second locking portion includes a front wall portion (228A) extending downward from an edge of the first belt hole and abutting a front end of the second portion, and a lower wall portion (228B) that extends rearward from a lower end of the front wall portion and abuts against a lower end of the second portion.

According to this aspect of the present invention, the second locking portion can come into contact with the front end and the lower end of the second portion.

In the above aspect of the present invention, preferably, the first belt hole is sized so as to allow a tongue plate (216) provided on the seat belt to pass therethrough, the second belt hole is sized so as not to allow the tongue plate to pass therethrough, and the main body is provided with a slit (251) extending from the second belt hole to a side edge of the main body.

According to this aspect of the present invention, the seat belt fitted with the tongue plate can be placed in the first belt hole and the second belt hole. Further, the tongue plate is prevented from passing through the second belt hole and being drawn into the seat.

Effect of the Invention

The vehicle seat comprises: a seat frame (7); a belt guide (13) attached to the seat frame, and a coupling member (20) coupling the belt guide to the seat frame, wherein the seat frame is provided with a first locking portion (22) extending in a first direction, and the belt guide is provided with a first receiving hole (41) extending in the first direction and through which the first locking portion passes, and a second receiving hole (42) extending in a second direction orthogonal to the first direction and receiving a part of the coupling member, the coupling member received in the second receiving hole being engaging the first locking portion passing through the first receiving hole.

According to this aspect of the present invention, in a vehicle seat, the belt guide can be fixed to the seat frame without using a tool. The first direction, in which the first locking portion is inserted into the first receiving hole, and the second direction, in which the coupling member is inserted into the second receiving hole, are orthogonal to each other. Therefore, even if a load is applied to the first locking portion in the direction of coming out of the first receiving hole, no load is applied to the coupling member in the direction of coming out of the second receiving hole. Therefore, the belt guide is fixed to the seat frame in a highly stable manner.

In this aspect of the present invention, preferably, the seat frame is provided with a plate portion (24) extending along a plane orthogonal to the first direction, a tip end portion of the first locking portion extends in a direction orthogonal to both the first direction and the second direction, and a surface of the tip end portion of the first locking portion facing the plate portion abuts against an abutting piece (64) of the coupling member.

According to this aspect of the present invention, the coupling member inserted into the second receiving hole can lock the first locking portion.

In this aspect of the present invention, preferably, the abutting piece extends in the second direction inside the second receiving hole.

According to this aspect of the present invention, by inserting the coupling member into the second receiving hole, the first locking portion can be locked by the abutting piece.

In this aspect of the present invention, preferably, the coupling member is provided with an elastic claw (63) that is deflectable in the first direction, and the belt guide is provided with a second locking portion (67) that locks the elastic claw and restricts movement of the coupling member in the second direction.

According to this aspect of the present invention, the coupling member is prevented from being dislodged from the belt guide.

In this aspect of the present invention, preferably, the second locking portion is formed inside the second receiving hole.

According to this aspect of the present invention, the elastic claw and the second locking portion can be concealed inside the belt guide.

In this aspect of the present invention, preferably, the belt guide includes a leg portion (31) extending along the plate portion, a guide portion (32) connected to the leg portion and allowing the seat belt to pass therethrough, and a first projection (51) protruding from the leg portion toward the plate portion, and the plate portion is provided with a first positioning hole (26) for receiving the first projection.

According to this aspect of the present invention, the belt guide is prevented from rotating around the first locking portion.

In this aspect of the present invention, preferably, the first receiving hole and the second receiving hole are formed in the leg portion, and an outer surface of the coupling member and an outer surface of the leg portion jointly form a continuous outer surface.

According to this aspect of the present invention, the seat belt is prevented from being snagged by the coupling member.

In this aspect of the present invention, preferably, a second positioning hole (27) is formed in the plate portion, the first locking portion is a plate piece that is cut and raised to form the second positioning hole, and the leg portion is provided with a plurality of second projections (52) abutting against an edge of the second positioning hole.

According to this aspect of the present invention, the belt guide is prevented from rotating around the first locking portion.

In this aspect of the present invention, preferably, the second projections include a pair of second projections arranged at intervals along the second direction, and the first locking portion is positioned between the second projections along the second direction.

According to this aspect of the present invention, the belt guide is prevented from rotating around the first locking portion.

In this aspect of the present invention, preferably, a skin material is placed along a surface of the plate portion, a part of the skin material is clamped between the plate portion and the leg portion, and the first locking portion and the first projection penetrate the skin material.

According to this aspect of the present invention, the belt guide can be positioned on the outer surface of the skin material.

BRIEF DESCRIPTION OF THE DRAWINGS

FIG. 2 is a perspective view of a belt guide of the first embodiment;

FIG. 13 is a perspective view of a belt guide of the other modified embodiment;

FIG. 16 is a perspective view of a base member of the other modified embodiment as viewed from a back side;

FIG. 23 is a side view of a hinge unit of the yet other modified embodiment when the arm rest is in a storage position.

DETAILED DESCRIPTION OF THE PREFERRED EMBODIMENT(S)

A vehicle seat according to the present invention will be described in the following in terms of preferred embodiments thereof with reference to the appended drawings. The seat may be installed in vehicles such as automobiles, trains, airplanes, ships, and the like.

Figure 1:
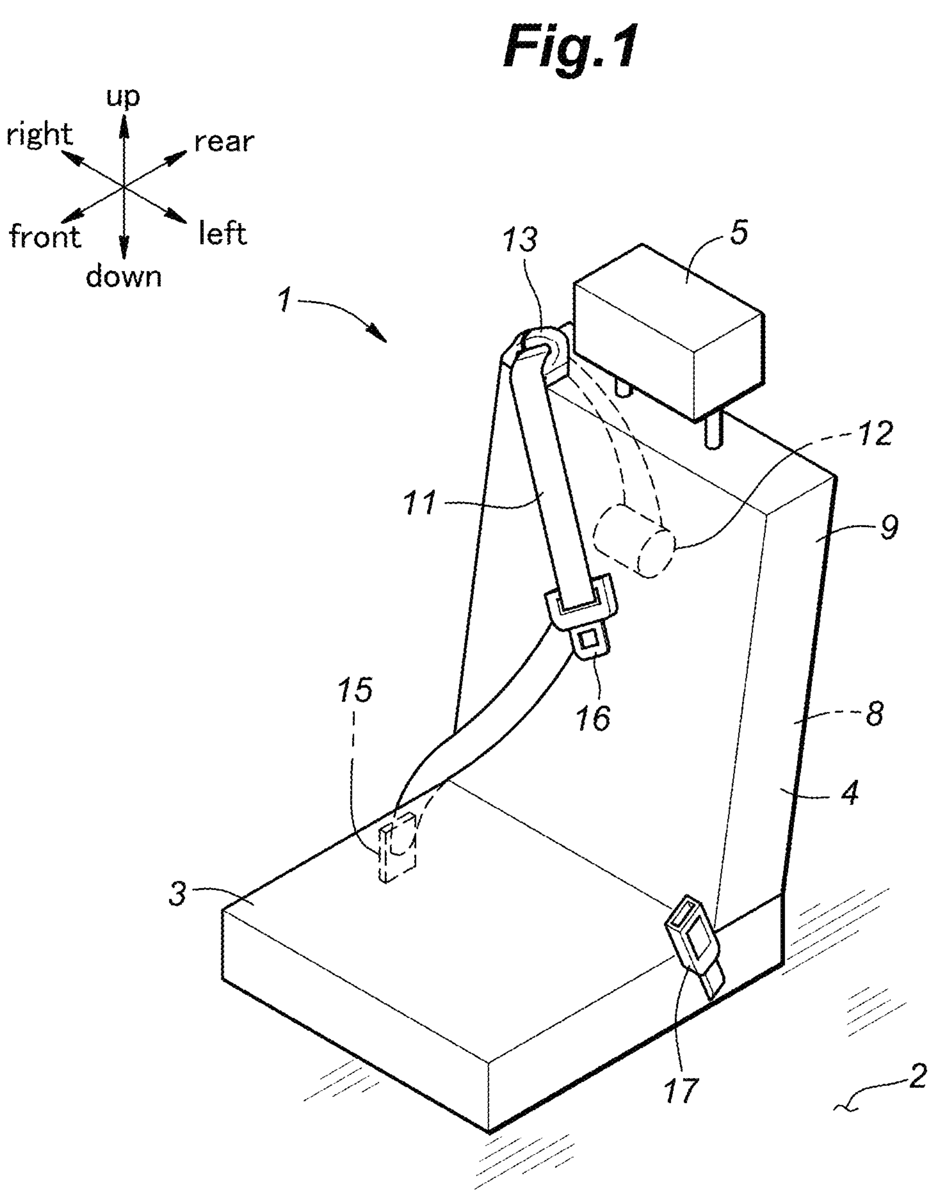
FIG. 1 is a perspective view of a seat according to a first embodiment of the present invention.

As shown in FIG. 1, the seat 1 includes a seat cushion 3 provided on a floor 2, a seat back 4, and a headrest 5. The seat cushion 3 supports the occupant's buttocks from below. The seat back 4 extends upward from the rear of the seat cushion 3. The seat back 4 supports the occupant's back from the rear. The headrest 5 is provided centrally at the upper end of the seat back 4. The headrest 5 supports the occupant's head from behind.

The seat cushion 3 and the seat back 4 are each provided with a seat frame 7 forming a skeletal structure, a pad 8 supported by the seat frame 7, and a skin material 9 covering the surface of the pad 8.

A belt retractor 12 for retracting a seat belt 11 is provided inside the seat back 4. A belt guide 13 that defines a passage for the seat belt 11 is provided at the upper end of the seat back 4. The seat belt 11 extends upward from the belt retractor 12 located inside the seat back 4, projects from the upper end of the seat back 4, passes through the belt guide 13, and extends to the front side of the seat back 4. Thus, the belt guide 13 determines the position of the seat belt 11 as the seat belt 11 passes the upper end of the seat back 4.

One end of the seat belt 11 is connected to a belt anchor 15 which is fixed to the seat cushion 3. A tongue plate 16 is provided in a part of the seat belt 11 located between the belt guide 13 and the belt anchor 15. The seat belt 11 is passed through an insertion hole formed in the tongue plate 16 so that the tongue plate 16 is movable along the length of the seat belt 11. The belt guide 13 and the belt anchor 15 are provided laterally on one side of the seat 1. A buckle 17 is provided laterally on the other side of the seat cushion 3 and is detachably coupled to the tongue plate 16.

Figure 2:
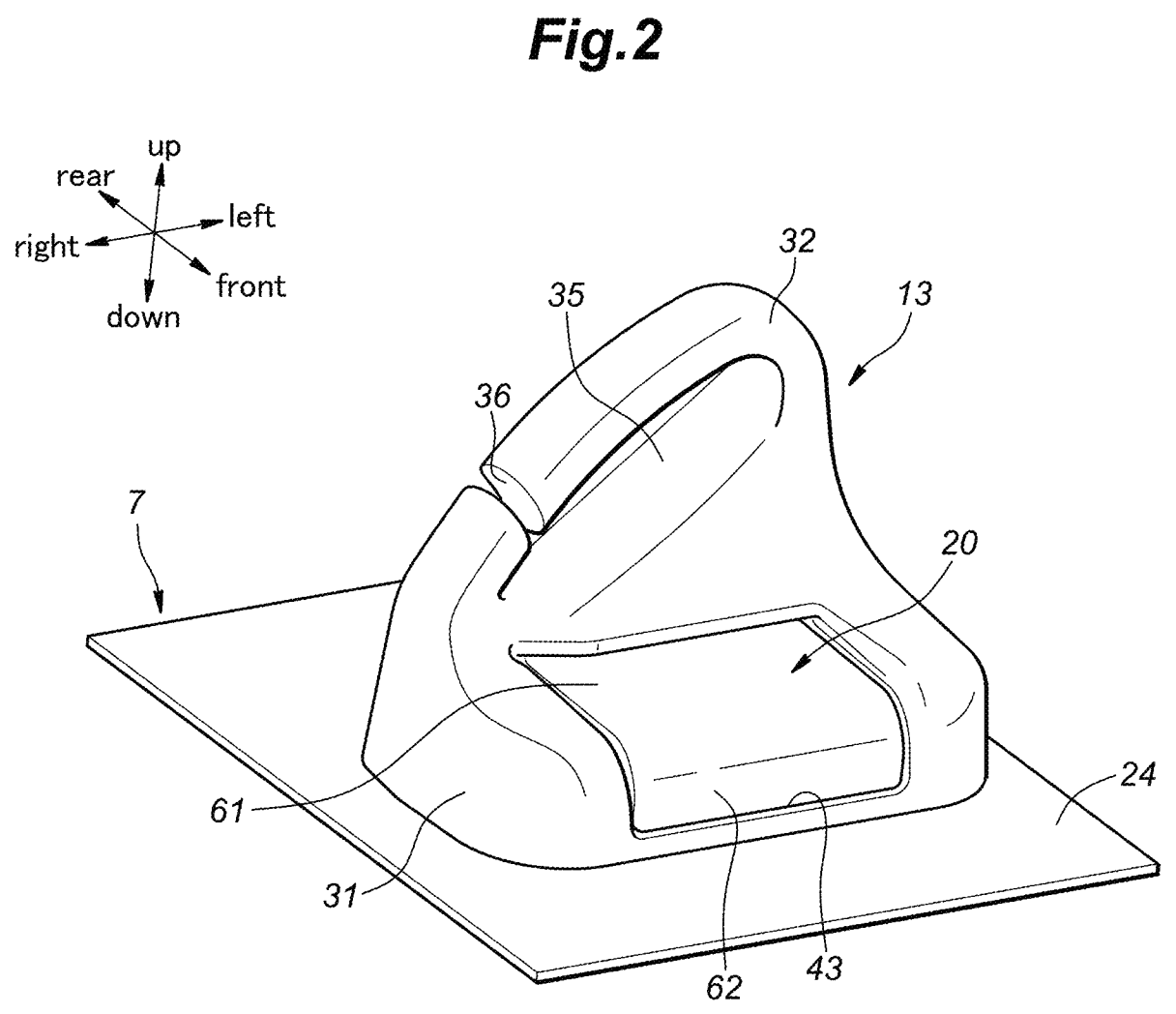
Figure 3:
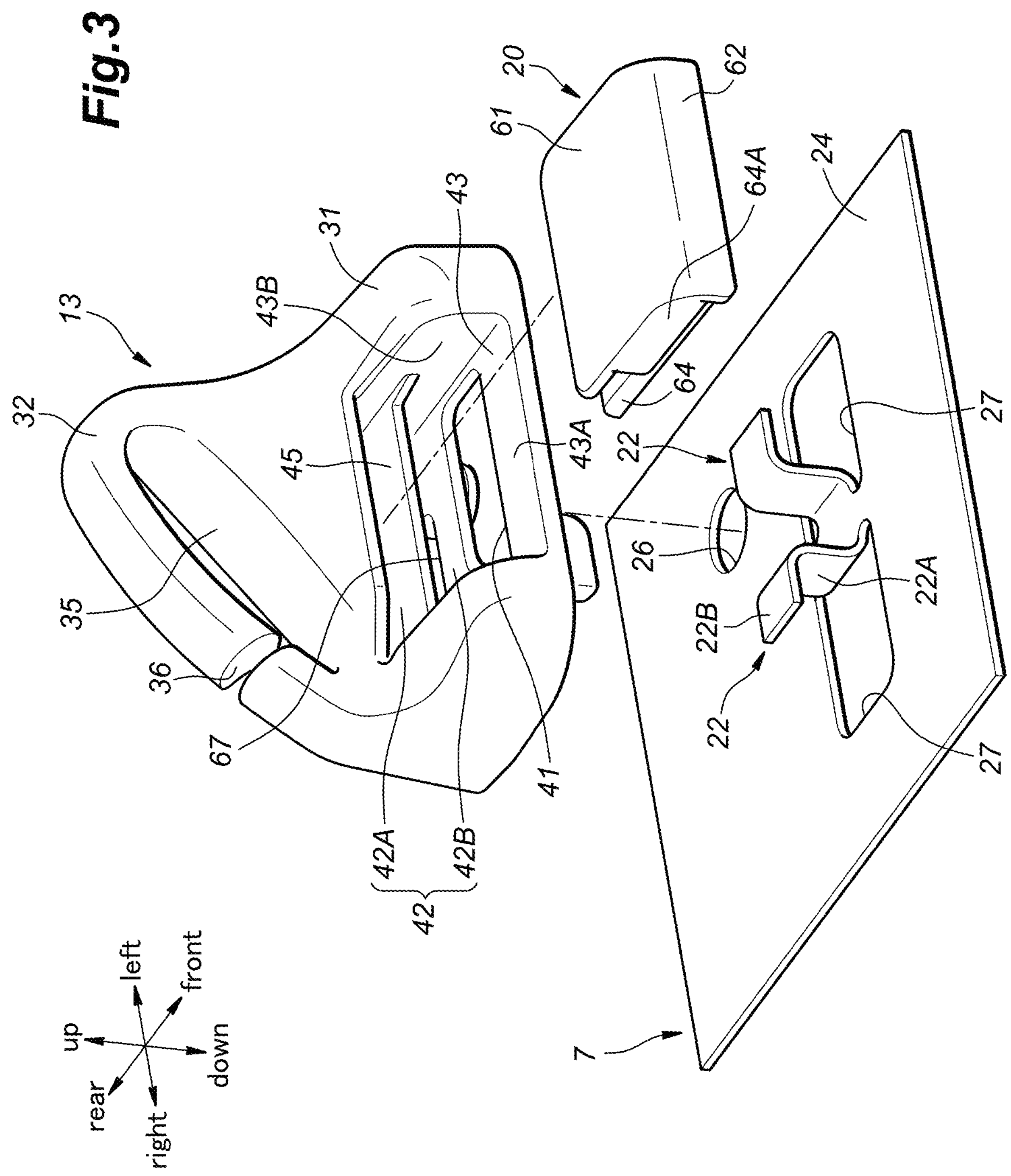
FIG. 3 is an exploded perspective view of a coupling structure of the belt guide of the first embodiment.

As shown in FIGS. 2 and 3, the belt guide 13 is attached to the seat frame 7 by a coupling member 20. As shown in FIG. 3, the seat frame 7 has a first locking portion 22 extending in a first direction. In this embodiment, the first direction is the vertical direction. A direction perpendicular to the first direction is referred to as a second direction, and a direction perpendicular to both the first direction and the second direction is referred to as a third direction. The second direction may be the fore and aft (front and rear) direction, and the third direction may be the lateral (left and right) direction.

The seat frame 7 has a plate portion 24 extending in a plane perpendicular to the first direction. In this embodiment, the surface of the plate portion 24 faces in the vertical direction. The plate portion 24 is provided at the upper end of the seat back 4. The plate portion 24 is provided inside or under the skin material 9. The pad 8 may be provided inside the skin material 9.

In this embodiment, the seat frame 7 is provided with a pair of first locking portions 22 positioned laterally next to each other. The first locking portions 22 extend upward from the plate portion 24. Each first locking portions 22 consists of a plate piece cut out and raised from the plate portion 24. The first locking portion 22 has a base end portion 22A extending upward from the plate portion 24, and a tip end portion 22B extending laterally from the upper end of the base end portion 22A. The tip end portion 22B extends in a direction facing away from the other first locking portion 22. Thus, the tip end portion 22B of each first locking portion 22 extends in a direction perpendicular to both the first direction and the second direction. The base end portion 22A and the tip end portion 22B are formed by bending a plate piece.

A first positioning hole 26 and a pair of second positioning holes 27 are formed in the plate portion 24. The first positioning hole 26 and the second positioning holes 27 penetrate the plate portion 24 in the thickness direction. The second positioning holes 27 are formed by cutting and raising the corresponding first locking portions 22. Each first locking portion 22 is provided at an edge of the corresponding second positioning hole 27. The second positioning holes 27 are elongated in the lateral direction and are lined up with each other in the lateral direction. The first locking portions 22 are provided at the edges of the corresponding second positioning holes 27 that are adjacent to each other.

Figure 7:
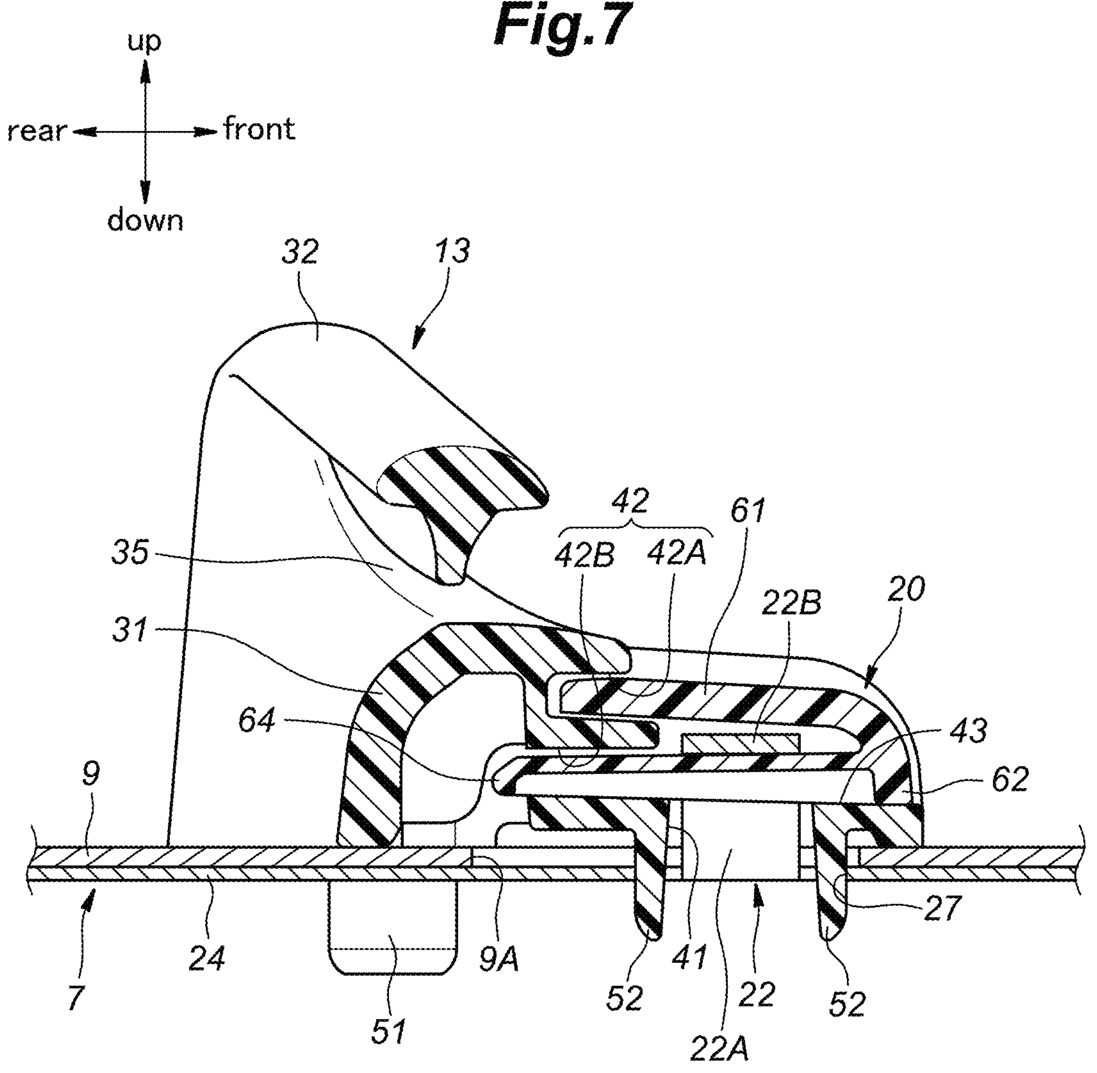
FIG. 7 is a sectional view of the coupling structure of the belt guide of the first embodiment (taken along line VII-VII of FIG. 2)
Figure 8:
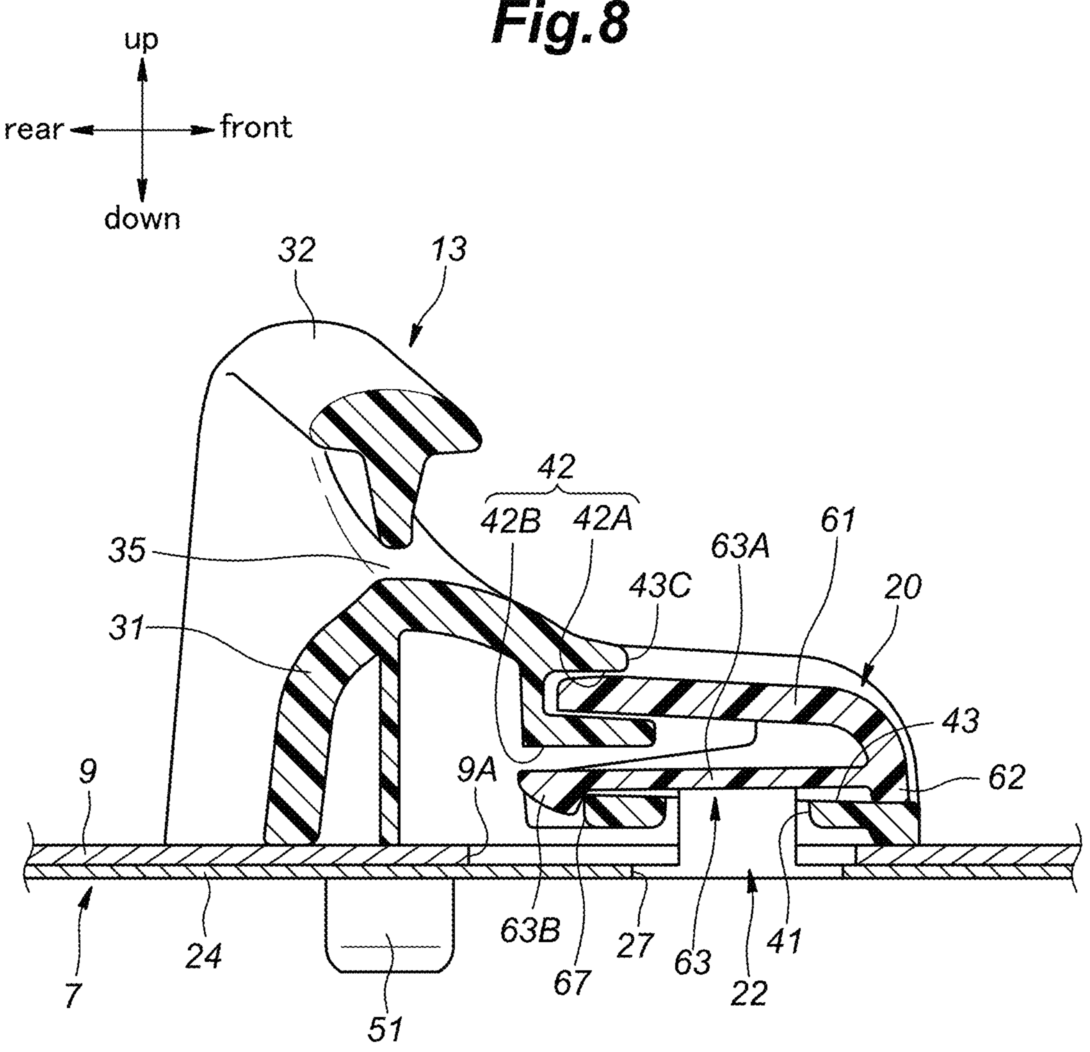
FIG. 8 is a sectional view of the coupling structure of the belt guide of the first embodiment (taken along line VIII-VIII of FIG. 2)

As shown in FIGS. 7 and 8, the skin material 9 is formed with a skin opening 9A corresponding to the first locking portions 22, the first positioning hole 26, and the second positioning holes 27. The first locking portions 22, the first positioning hole 26, and the second positioning holes 27 are exposed above the skin material 9 through the skin opening 9A.

Figure 4:
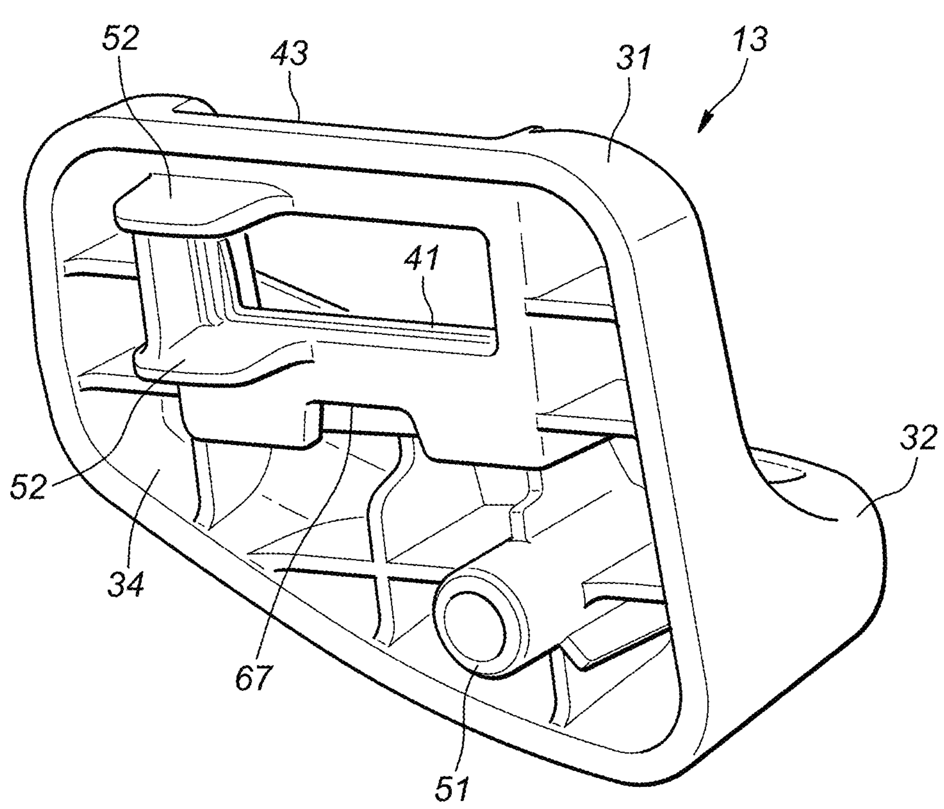
FIG. 4 is a perspective view of the belt guide of the first embodiment as viewed from a back side.

As shown in FIGS. 3 and 4, the belt guide 13 includes a leg portion 31 extending along the plate portion 24, and a guide portion 32 connected to the leg portion 31 and through which the seat belt 11 passes. The leg portion 31 has a thickness in the vertical direction. Preferably, a plurality of hollowed out portions 34 are formed on the bottom surface of the leg portion 31. The guide portion 32 projects upward from the leg portion 31 and is formed with a belt insertion hole 35 through which the seat belt 11 passes. In this embodiment, the belt insertion hole 35 penetrates the guide portion 32 in the fore and aft direction. The belt insertion hole 35 is an elongated hole extending in the lateral direction. Further, the belt insertion hole 35 is preferably inclined upwardly toward the laterally inward part of the seat back 4. A slit 36 extending from the belt insertion hole 35 to the outer edge of the guide portion 32 is formed in the guide portion 32. The seat belt 11 can be placed in the belt insertion hole 35 through the slit 36.

The belt guide 13 has a first receiving hole 41 and a second receiving hole 42. The first receiving hole 41 extends in the first direction (vertical direction), and the first locking portions 22 pass therethrough. The second receiving hole 42 extends in a second direction (fore and aft direction) orthogonal to the first direction to receive a part of the coupling member 20.

The first receiving hole 41 and the second receiving hole 42 are formed in the leg portion 31. A recess 43 is formed in the leg portion 31 so as to be recessed downward from the upper surface of the leg portion 31. The recess 43 extends in the fore and aft direction and opens at the front end of the leg portion 31. The recess 43 is defined by a recess bottom surface 43A, left and right recess side surfaces 43B, and a recess rear surface 43C, and is open upward and forward. The first receiving hole 41 extends from the bottom surface of the leg portion 31 to the recess bottom surface 43A and communicates with the recess 43. The second receiving hole 42 is recessed rearward to the recess rear surface 43C. The second receiving hole 42 is divided into an upper hole 42A and a lower hole 42B by a horizontal partition wall 45 which faces upward and downward. The upper hole 42A and the lower hole 42B are elongated in the lateral direction. Further, the lower hole 42B may be divided into three parts in the lateral direction by a pair of vertical partition walls which face laterally.

As shown in FIG. 4, a first projection 51 and a plurality of second projections 52 are provided on the bottom surface of the leg portion 31. The first projection 51 is formed in a cylindrical shape and protrudes from the bottom surface of the leg portion 31 toward the side of the plate portion 24 or downward. The second projections 52 include a pair of second projections 52 positioned at an interval in the second direction (fore and aft direction). Each of the second projections 52 is formed in a plate shape having a major plane facing forward and rearward, and protrudes downward from the front and rear edges of the first receiving hole 41. Thus, the first locking portions 22 are positioned between the second projections 52 along the second direction (fore and aft direction).

The first projection 51 passes through the skin opening 9A and fits into the first positioning hole 26. As shown in FIG. 7, the second projections 52 pass through the skin opening 9A, protrude into one of the second positioning holes 27, and come into contact with the edge of the second positioning hole 27. The second projections 52 abut against the front and rear edges of the second positioning hole 27. More specifically, the second projections 52 fit into one of the second positioning holes 27. By fitting the first projection 51 into the first positioning hole 26 and fitting the second projections 52 into one of the second positioning holes 27, the positioning of the belt guide 13 relative to the plate portion 24 in the horizontal direction can be accomplished. At this time, the tip end portions 22B of the first locking portions 22 pass through the first receiving hole 41 and are positioned within the recess 43.

Figure 5:
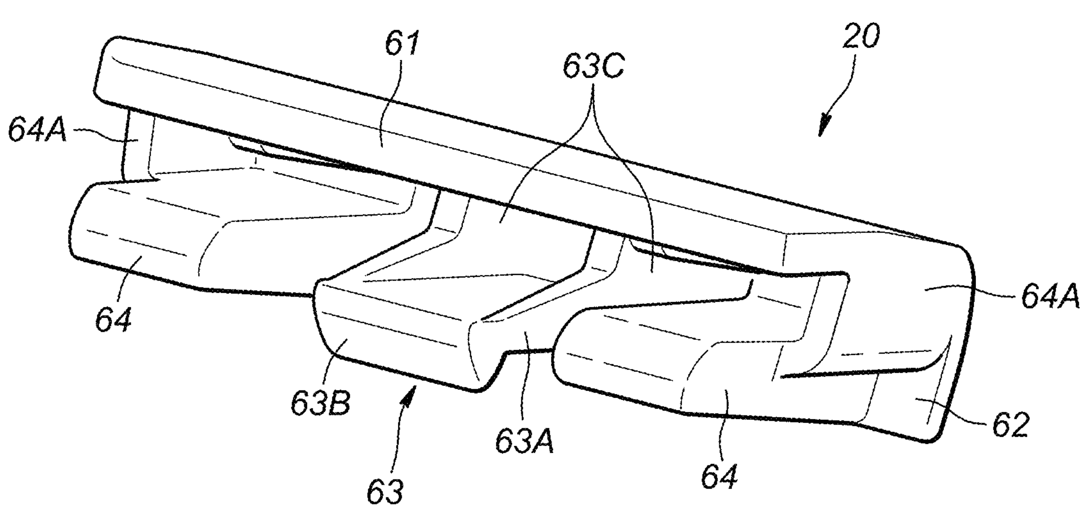
FIG. 5 is a perspective view of a coupling member of the first embodiment.
Figure 6:
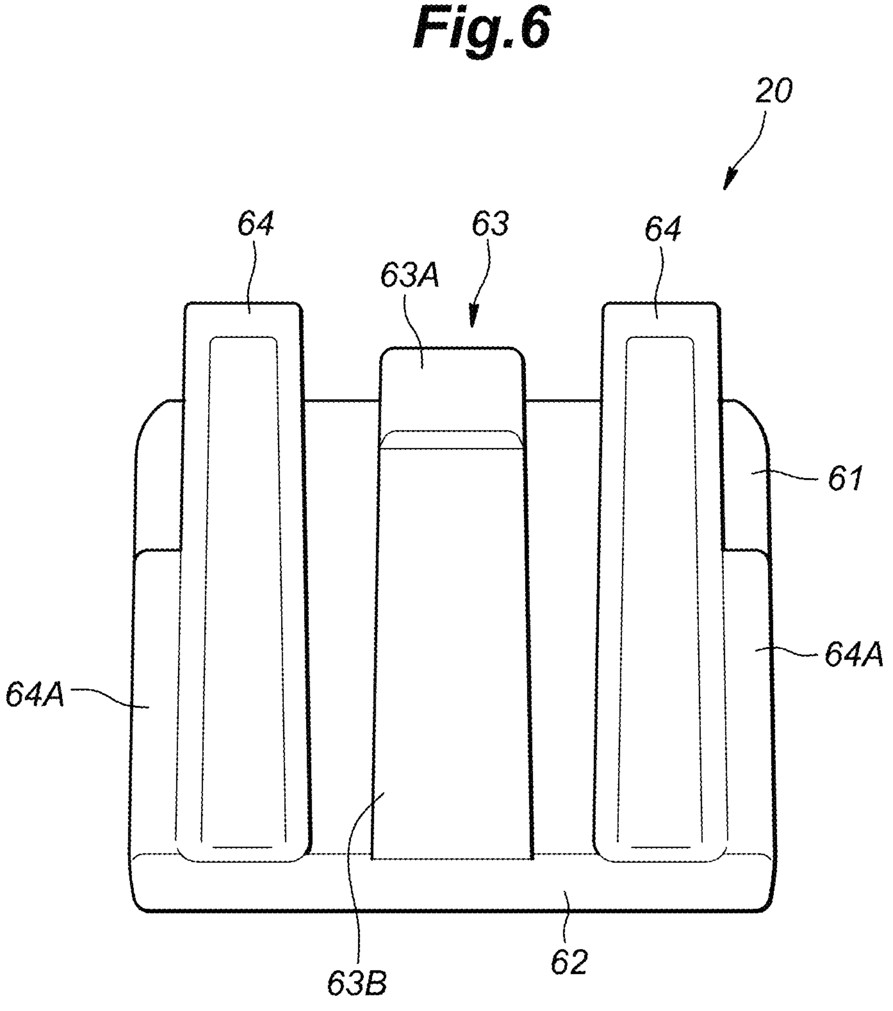
FIG. 6 is a bottom view of the coupling member of the first embodiment.

As shown in FIGS. 5 and 6, the coupling member 20 includes an upper wall portion 61 facing upward and downward, a front wall portion 62 extending downward from the front edge of the upper wall portion 61, and an elastic claw 63 and a pair of abutting pieces 64 extending rearward from the front wall portion 62. The elastic claw 63 is positioned between the abutting pieces 64 in the lateral direction. The abutting pieces 64 are cantilever beams extending rearward. The base end of each abutting piece 64 is connected to the upper wall portion 61 by a reinforcing wall 64A.

The elastic claw 63 includes a beam portion 63A extending rearward, and a claw portion 63B projecting downward from the tip of the beam portion 63A. The tip of the beam portion 63A is deflectable in the first direction (vertical direction). The base end of the beam portion 63A is connected to the upper wall portion 61 by a pair of reinforcing walls 63C.

As shown in FIGS. 7 and 8, the rear ends of the elastic claw 63 and the abutting pieces 64 are passed into the lower hole 42B, and the rear end of the upper wall portion 61 is passed into the upper hole 42A. As a result, movement of the coupling member 20 relative to the belt guide 13 in the vertical and horizontal direction is prohibited. Each abutting piece 64 extends within the second receiving hole 42 in the second direction. As shown in FIG. 8, the belt guide 13 is provided with a second locking portion 67 that locks the elastic claw 63 so as to restrict movement of the coupling member 20 in the second direction (fore and aft direction). The second locking portion 67 is formed on the lower wall portion defining the lower part of the lower hole 42B, and extends from the lower hole 42B to the bottom surface of the leg portion 31. By locking the claw portion 63B of the elastic claw 63 with the second locking portion 67, movement of the coupling member 20 with respect to the belt guide 13 in the fore and aft direction is restricted. The second locking portion 67 is formed inside the second receiving hole 42.

At this time, as shown in FIG. 7, the coupling member 20 engages with the first locking portions 22 that are passed through the first receiving hole 41. More specifically, the surface of the tip end portion 22B of each first locking portion 22 facing the side of the plate portions 24 comes into contact with the corresponding abutting piece 64 of the coupling member 20. Each abutting piece 64 extends under the tip end portion 22B of the corresponding first locking portion 22 in the fore and aft direction. This restricts vertical movement of first locking portions 22 with respect to the belt guide 13.

As described above, the belt guide 13 is fixed to the plate portion 24 of the seat frame 7 by the coupling member 20. At this time, a part of the skin material 9 is clamped between the plate portion 24 and the leg portion 31. The first locking portions 22 and the first projections 51 are passed through the skin material 9 and extend vertically. Further, the second projections 52 also extend vertically through the skin material 9.

As shown in FIG. 2, the outer surface of the coupling member 20 and the outer surface of the leg portion 31 cooperate with each other to form a continuous outer surface. The upper surface of the upper wall portion 61 of the coupling member 20 is disposed on the same plane as the upper surface of the leg portion 31. Further, the front surface of the front wall portion 62 of the coupling member 20 is disposed on the same plane as the front surface of the leg portion 31. In this way, the coupling member 20 is positioned inside the recess 43 and the second receiving hole 42, and this prevents the seat belt 11 from being snagged on the coupling member 20.

The method for attaching the belt guide 13 to the seat 1 is as follows. First, the seat back 4 is prepared by covering the seat frame 7 with the pad 8 and the skin material 9. The skin material 9 also covers the plate portion 24. The first locking portions 22 are passed through the skin opening 9A so as to protrude above the skin material 9.

Next, the leg portion 31 of the belt guide 13 is positioned on the plate portion 24 so that the first locking portions 22 are passed through the first receiving holes 41. At this time, the first projection 51 fits into the first positioning hole 26 and the second projections 52 fit into one of the second positioning holes 27 with the result that the belt guide 13 is positively positioned with respect to the plate portion 24. In this state, the edge part of the skin opening 9A is held or clamped between the plate portion 24 and the leg portion 31. Furthermore, the tip end portions 22B of the first locking portions 22 are positioned within the recess 43.

Next, the coupling member 20 is inserted into the recess 43 and the second receiving hole 42. At this time, each abutting piece 64 passes under the tip end portion 22B of the corresponding first locking portion 22 and enters the second receiving hole 42. Further, the elastic claw 63 passes between the two first locking portions 22 and enters the second receiving hole 42. The coupling member 20 is fixed to the belt guide 13 by the elastic claw 63 being engaged with the second locking portion 67.

According to the embodiment described above, in the seat 1, the belt guide 13 can be fixed to the seat frame 7 without using a tool. The first direction, in which the first locking portions 22 are inserted into the first receiving hole 41, and the second direction, in which the coupling member 20 is inserted into the second receiving hole 42 are orthogonal to each other. Therefore, even if a load is applied to the first locking portions 22 in the direction of coming out of the first receiving hole 41, no load is applied to the coupling member 20 in the direction of coming out of the second receiving hole 42. Therefore, the belt guide 13 can be fixed to the seat frame 7 in a highly stable manner. Since the coupling member 20 inserted into the second receiving hole 42 is restricted from moving in the vertical direction, it can lock the first locking portions 22 in a highly stable manner.

Since the second locking portion 67 is formed inside the second receiving hole 42, the elastic claw 63 and the second locking portion 67 can be concealed inside the belt guide 13. Thereby, the coupling member 20 can be prevented from being removed from the belt guide 13.

The present invention is not limited to the above-described embodiment, and can be modified and implemented in a wide range of ways. For example, the belt guide 13 may be mounted not only to the upper end of the seat back 4, but also to a side of the seat back 4, a side of the seat cushion 3, a side of a pillar forming the vehicle interior, or the like. Further, the orientation of the belt guide 13 may be freely selected depending on the direction of the seat belt 11.

Figure 9:
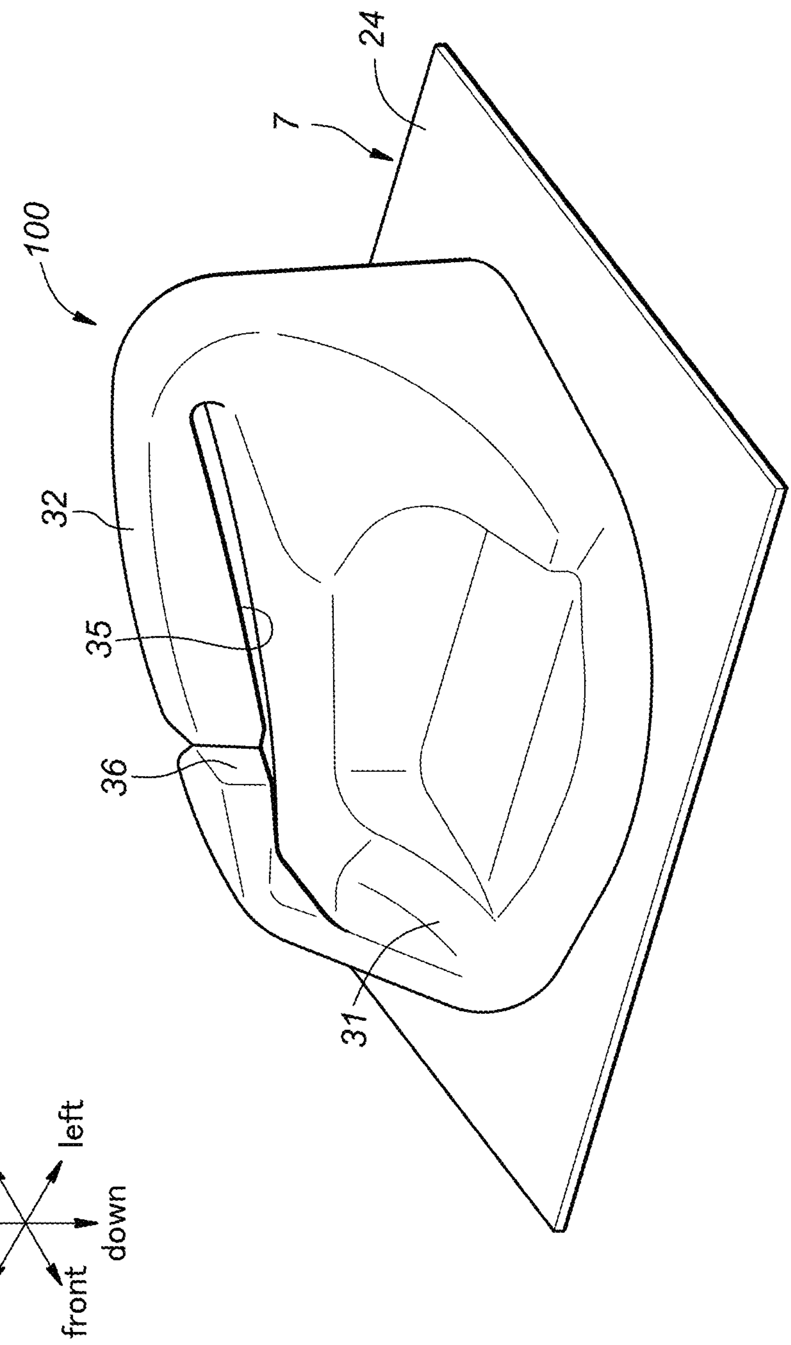
FIG. 9 is a perspective view of a seat according to a modified embodiment of the present invention.
Figure 10:
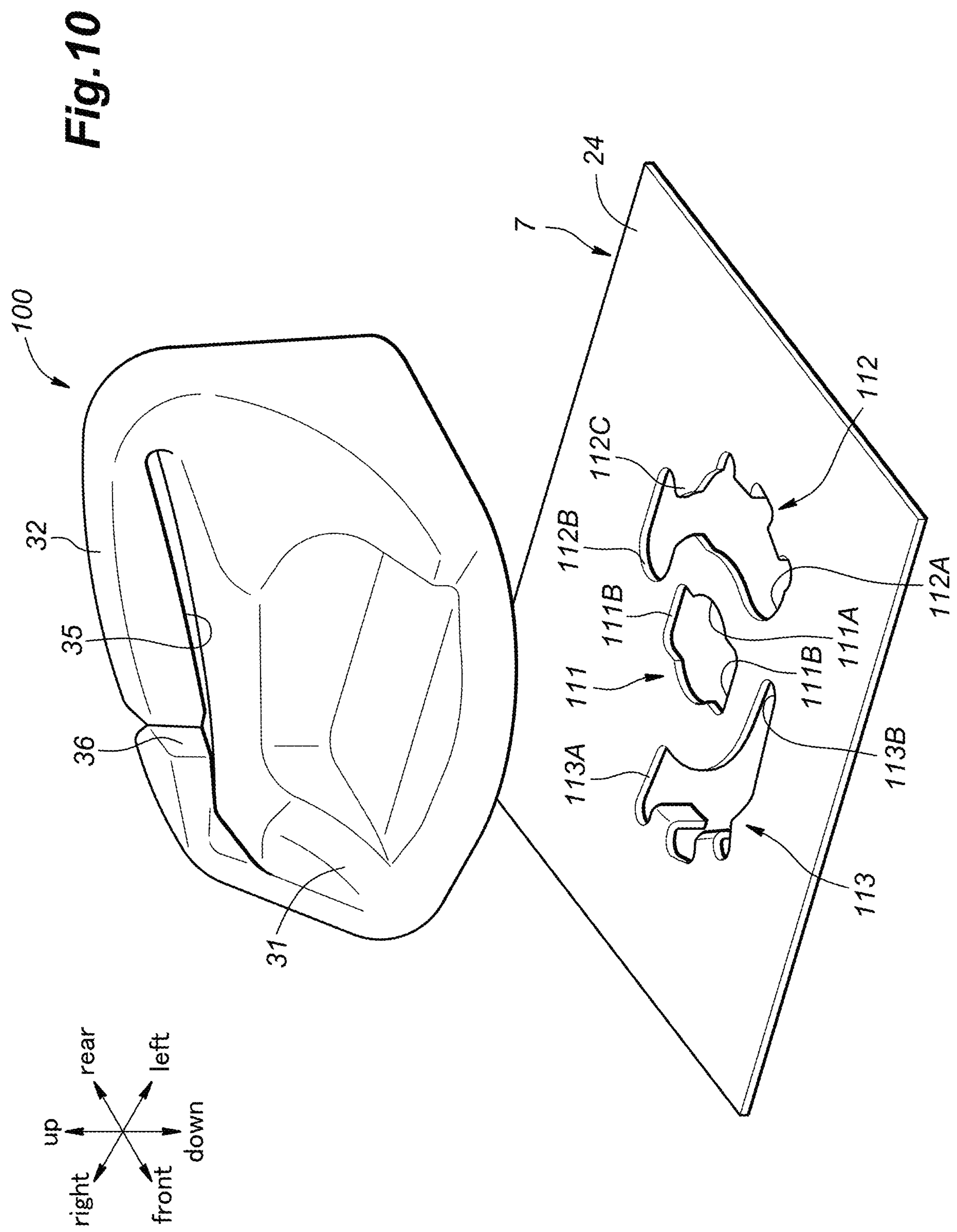
FIG. 10 is an exploded perspective view of a coupling structure of a belt guide of the modified embodiment.
Figure 11:
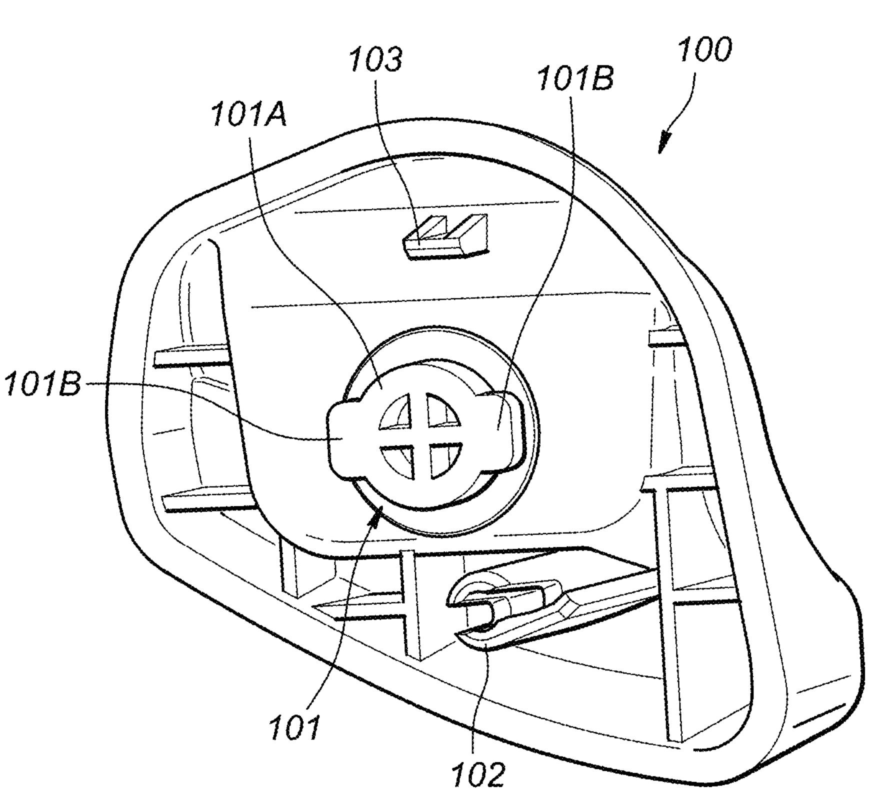
FIG. 11 is a bottom view of the belt guide of the modified embodiment.

In another embodiment, as shown in FIGS. 9 and 10, the belt guide 100 is provided with a latch 101, a first projection 102, and a second projection 103 at the bottom thereof. The latch 101 includes a columnar column portion 101A protruding from the center of the bottom of the belt guide 100, and a pair of claw portions 101B protruding radially outward from the tip of the column portion 101A. The first projection 102 and the second projection 103 protrude from the bottom of the belt guide 100 in parallel with the column portion 101A. The first projection 102 and the second projection 103 are preferably formed in a columnar shape or a plate shape. The first projection 102 and the second projection 103 are preferably positioned away from the latch 101 in the radial direction. Preferably, the latch 101 is positioned between the first projection 102 and the second projection 103. A guide portion 32 through which the seat belt 11 passes is provided in an upper part of the belt guide 100.

As shown in FIG. 10, a latch hole 111, a first hole 112, and a second hole 113 are formed in the plate portion 24 of the seat frame 7. The latch hole 111, the first hole 112, and the second hole 113 are through holes. The latch hole 111 has a circular central portion 111A through which the column portion 101A can pass, and a pair of extended portions 111B extending radially outward from the central portion 111A. The first hole 112 and the second hole 113 are formed around the latch hole 111. The first hole 112 and the second hole 113 are positioned on opposite sides of the latch hole 111.

The first hole 112 extends in the circumferential direction around the latch hole 111, and has a first end 112A and a second end 112B. The first end 112A is an end in the clockwise direction around the latch hole 111. The second end 112B is an end in the counterclockwise direction around the latch hole 111. The outer edge of the first hole 112 is provided with a locking portion 112C that protrudes toward the inner edge. The locking portion 112C may also be provided at the inner edge of the first hole 112 and protrude toward the outer edge.

The second hole 113 extends in the circumferential direction around the latch hole 111, and has a third end 113A and a fourth end 113B. The third end 113A is an end in the clockwise direction around the latch hole 111. The fourth end 113B is an end in the counterclockwise direction around the latch hole 111. The width of the second hole 113 becomes progressively narrower from the third end 113A to the fourth end 113B.

The skin material 9 is provided on the upper surface of the plate portion 24. The skin material 9 has a skin opening 9A corresponding to the latch hole 111, the first hole 112, and the second hole 113. The latch hole 111, the first hole 112, and the second hole 113 are exposed above the skin material 9 through the skin opening 9A.

The belt guide 100 is attached to the plate portion 24 as follows. First, the latch 101 is inserted into the latch hole 111. The latch 101 can be passed through the latch hole 111 by aligning the claw portions 101B with the extended portions 111B in the vertical direction. This state is defined as the initial state of the belt guide 100. At this time, the first projection 102 enters the first hole 112 and is located at the first end 112A thereof. Further, the second projection 103 enters the second hole 113 and is located at the third end 113A thereof.

Next, the belt guide 100 is rotated 90 degrees counterclockwise about the latch 101 from the initial state. As a result, the claw portions 101B of the latch 101 are displaced from the extended portions 111B to the positions located under the plate portion 24. As a result, the claw portions 101B are engaged by the edges of the latch hole 111 so that the latch 101 cannot be removed from the latch hole 111. At this time, the second projection 103 moves within the second hole 113 from the third end 113A to the fourth end 113B, and abuts against the fourth end 113B. This restricts any further rotation of the belt guide 100 in the counterclockwise direction. Further, the second projection 103 is held between the inner edge and outer edge of the second hole 113 at the fourth end 113B. This prevents rattling of the belt guide 100 with respect to the plate portion 24.

Further, the first projection 102 moves within the first hole 112 from the first end 112A to the second end 112B. In this process, the first projection 102 is pushed by the locking portion 112C, elastically deforms, and rides over the locking portion 112C. The first projection 102 returns to its original state when it reaches the second end 112B. The first projection 102 is locked by the locking portion 112C at the second end 112B, and movement toward the first end 112A is restricted. This restricts rotation of the belt guide 100 in the clockwise direction about the latch 101. As a result, the belt guide 100 is fixed to the plate portion 24 in a highly stable manner.

Figure 12:
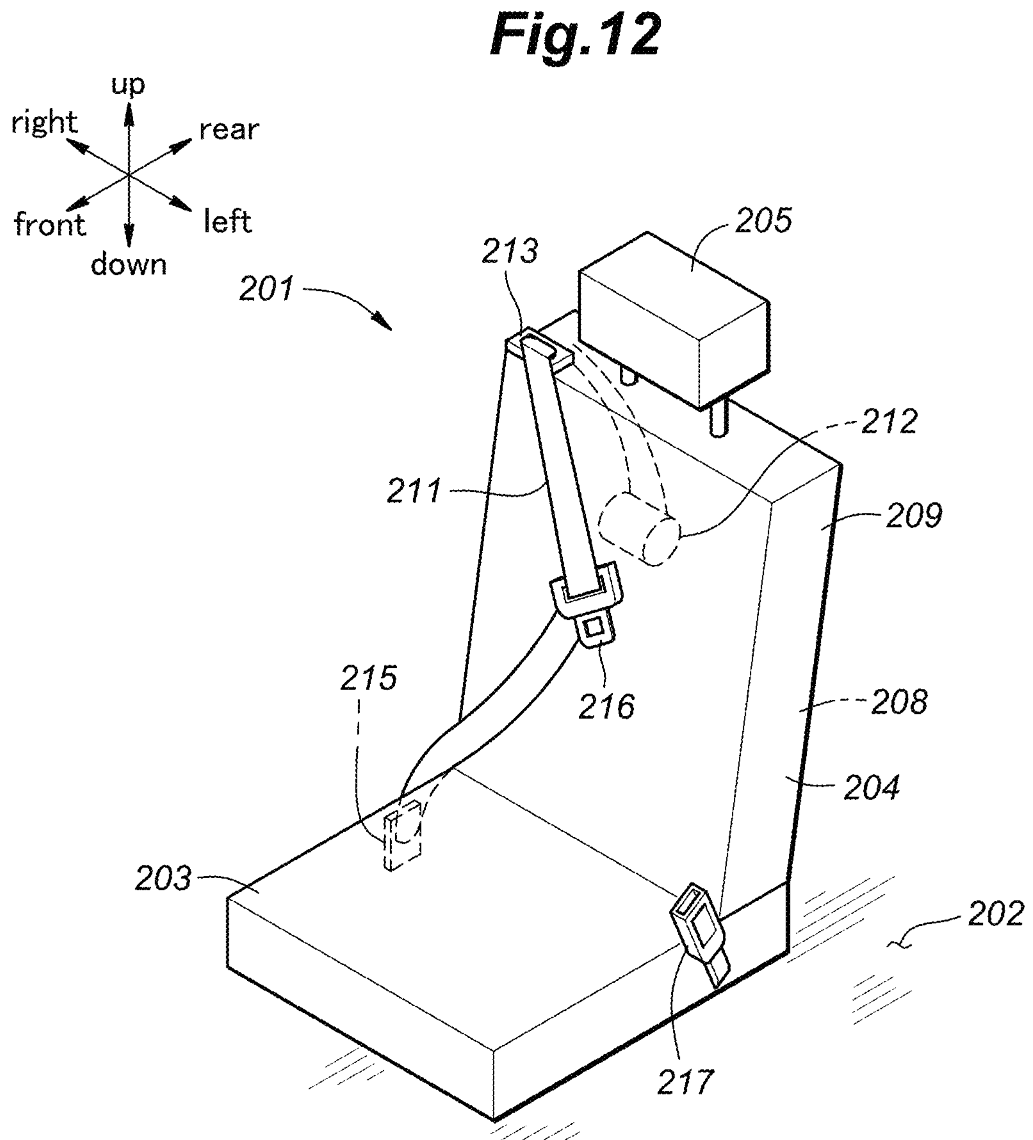
FIG. 12 is a perspective view of a seat according to another modified embodiment.

In yet another embodiment, as shown in FIG. 12, the seat 201 includes a seat cushion 203 provided on a floor 202, a seat back 204, and a headrest 205. The seat cushion 203 supports the occupant's buttocks from below. The seat back 204 extends upward from the rear of the seat cushion 203. The seat back 204 supports the occupant's back from the rear. The headrest 205 is provided at the center of the upper end of the seat back 204. The headrest 205 supports the occupant's head from behind.

The seat cushion 203 and the seat back 204 are each provided with a seat frame 207 forming a skeletal structure, a pad 208 supported by the seat frame 207, and a skin material 209 covering the surface of the pad 208.

A belt retractor 212 for retracting the seat belt 211 is provided inside the seat back 204. A belt guide 213 that defines a passage for the seat belt 211 is provided at the upper end of the seat back 204. The seat belt 211 extends upward from the belt retractor 212 inside the seat back 204, projects from the upper end of the seat back 204, passes through the belt guide 213, and extends to the front side of the seat back 204. Thus, the belt guide 213 determines a position of the seat belt 211 as the seat belt 211 passes the upper end of the seat back 204.

One end of the seat belt 211 is connected to a belt anchor 215 attached to the seat cushion 203. A tongue plate 216 is provided on a part of the seat belt 211 located between the belt guide 213 and the belt anchor 215. The seat belt 211 is passed through an insertion hole formed in the tongue plate 216 so that the tongue plate 216 is movable along the length of the seat belt 211. The belt guide 213 and the belt anchor 215 are provided laterally on one side of the seat 201. A buckle 217 is provided laterally on the other side of the seat cushion 203 and can be detachably connected to the tongue plate 216.

Figure 13:
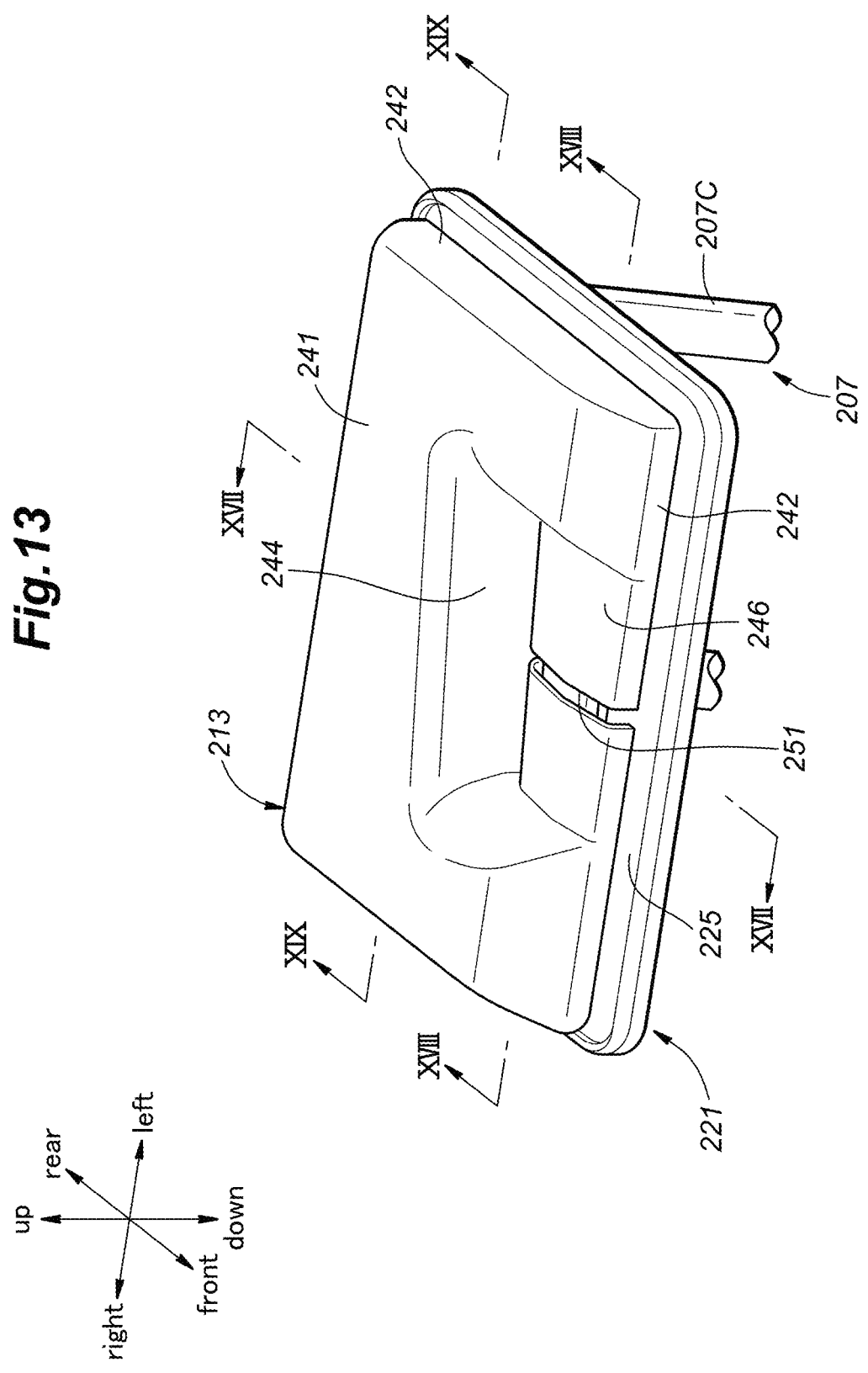
Figure 14:
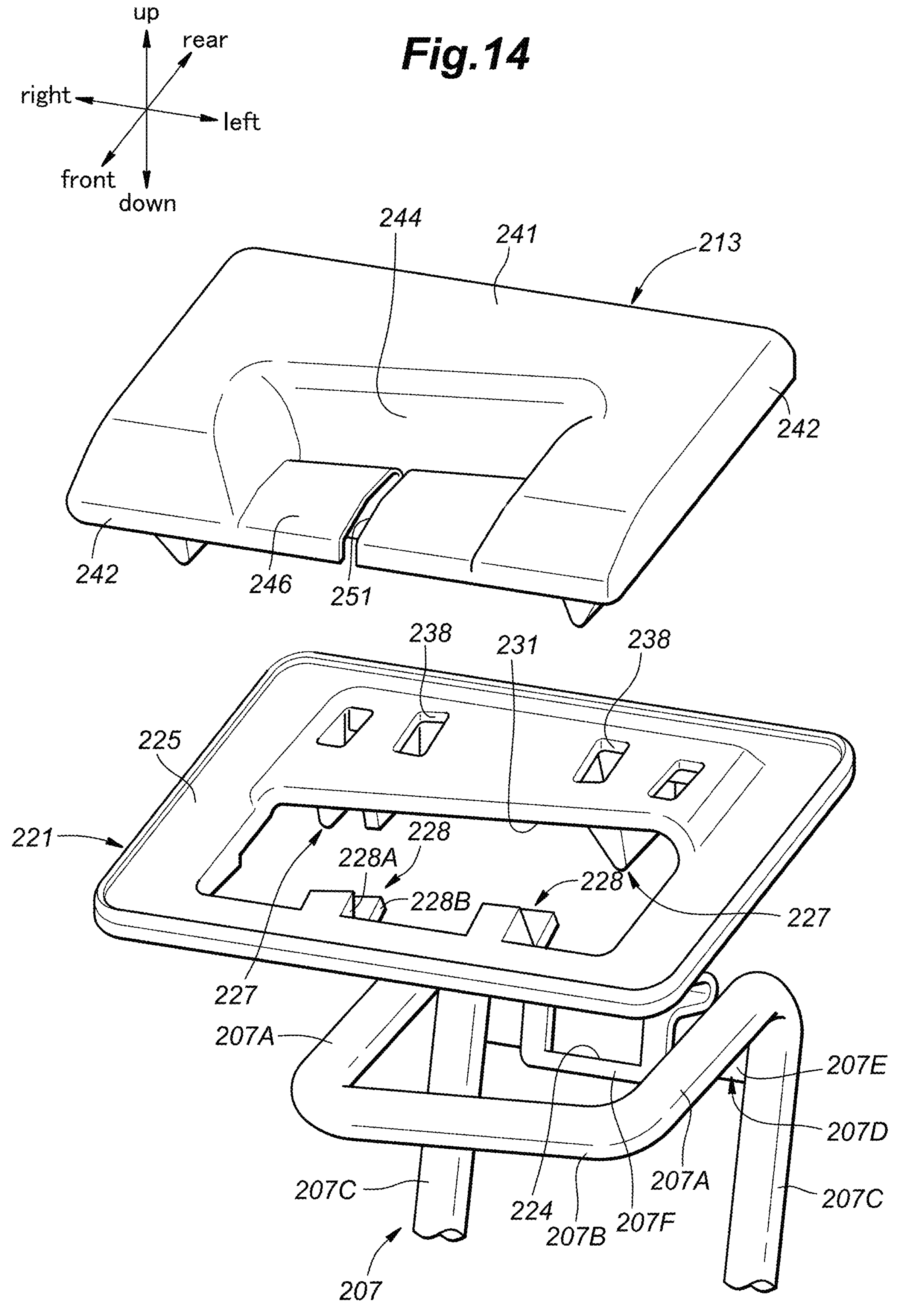
FIG. 14 is an exploded perspective view of a coupling structure of the belt guide of the other modified embodiment.

As shown in FIGS. 13 and 14, the belt guide 213 is attached to the seat frame 207 via a base member 221. As shown in FIG. 14, the seat frame 207 includes a pair of first portions 207A that extend in the fore and aft direction and laterally spaced from each other, and a second portion 207B that extends laterally between the front ends of the first portions 207A. The seat frame 207 further includes a pair of third portions 207C extending downward from the rear ends of the respective first portions 207A, and a fourth portion 207D extending laterally between the left and right third portions 207C. The left and right first portions 207A, the second portions 207B, and the left and right third portions 207C may be formed by bending a metal rod or a metal pipe. The left and right third portions 207C may be connected to the upper end of a part of the seat frame 207 that constitutes the seat back 204.

The fourth portion 207D preferably includes a rod-shaped member 207E extending laterally, and a bracket 207F attached to the rod-shaped member 207E. The bracket 207F is preferably formed by bending sheet metal. The bracket 207F of the fourth portion 207D is formed with a locking hole 224 that penetrates in the fore and aft direction.

Figure 16:
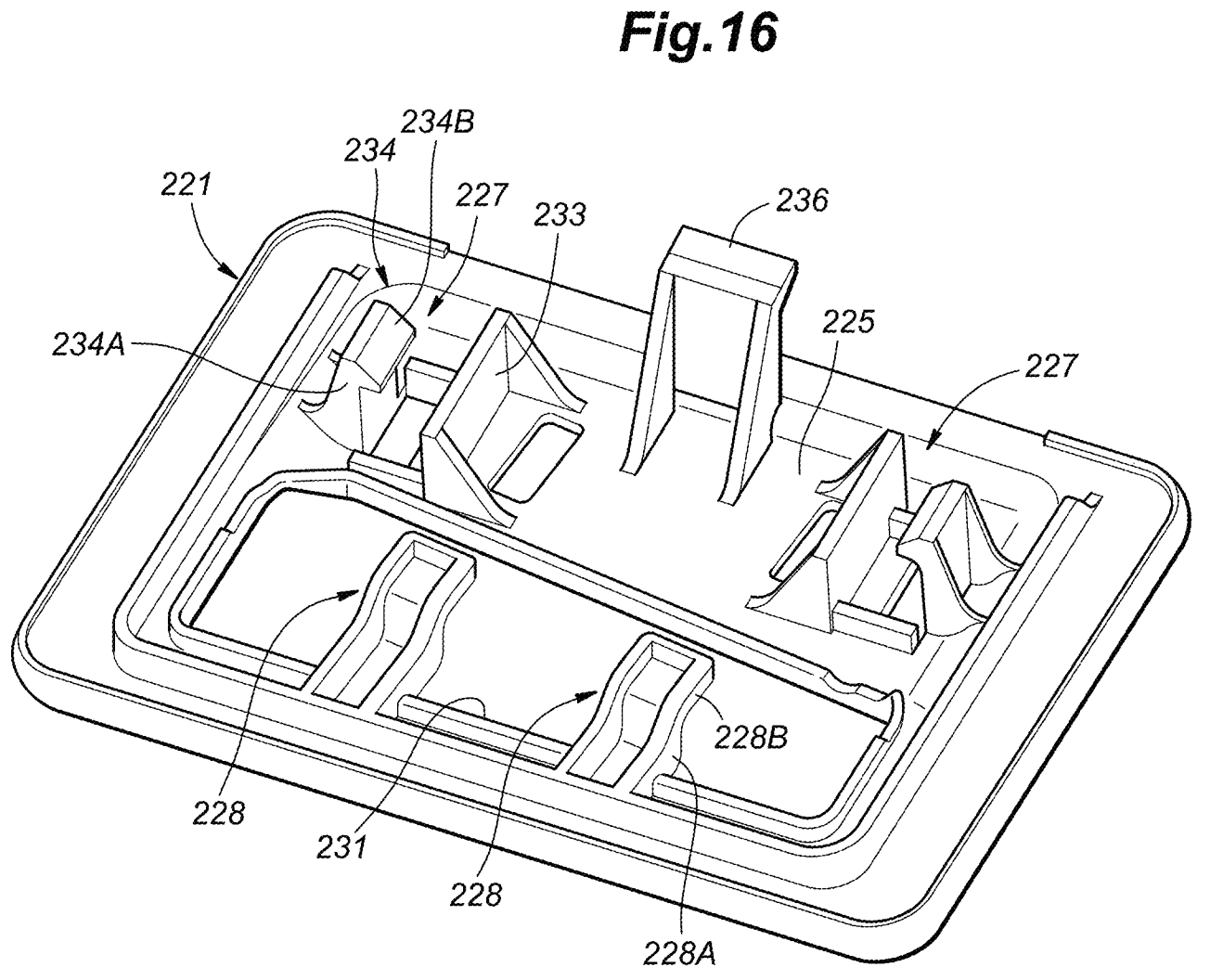

As shown in FIGS. 14 and 16, the base member 221 includes a plate portion 225 formed in a plate shape, a pair of first locking portions 227 and a pair of second locking portion 228, each pair of locking portions 227 and 228 being provided on right and left parts of the plate portion 225. The plate portion 225 has a surface facing in the fore and aft direction. The plate portion 225 has a first belt hole 231 through which the seat belt 211 passes. The first belt hole 231 is passed through the plate portion 225 in the thickness direction. The first belt hole 231 is formed in a front part of the plate portion 225. The first belt hole 231 is elongated in the lateral direction. The first belt hole 231 is sized so as to allow the tongue plate 216 provided on the seat belt 211 to pass therethrough. The front edge of the first belt hole 231 is positioned lower than the rear edge of the first belt hole 231.

Figure 19:
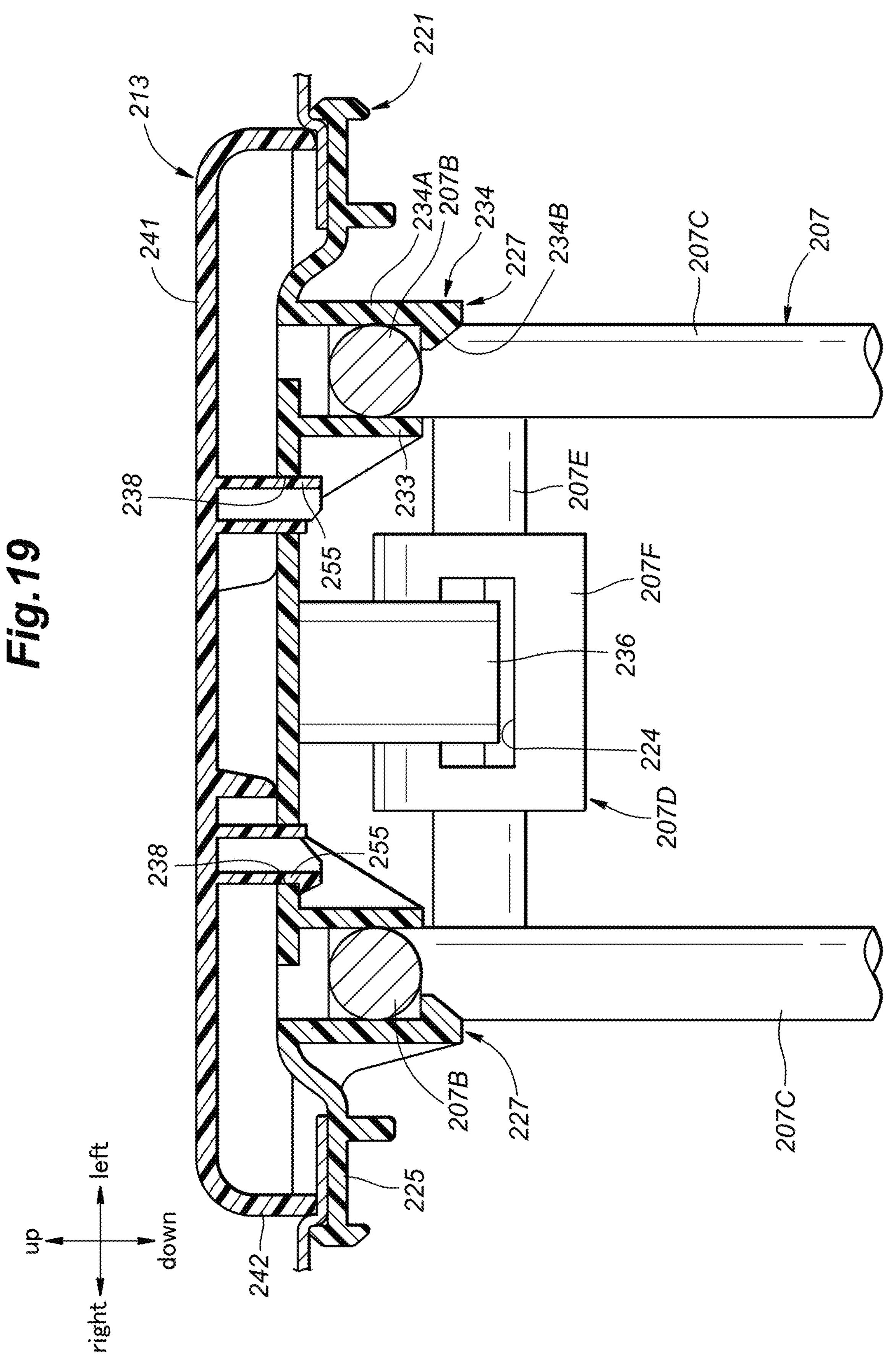
FIG. 19 is a sectional view of the coupling structure of the belt guide of the other modified embodiment (taken along line XV-XV of FIG. 13)

As shown in FIGS. 16 and 19, the left and right first locking portions 227 protrude downward from the lower surface of the plate portion 225. The first locking portions 227 lock the corresponding first portions 207A on the left and right sides. Each first locking portion 227 locks the corresponding first portion 207A so as to restrict vertical and horizontal movement of the base member 221 with respect to the first portion 207A. Each first locking portion 227 preferably forms a clamp that opens downward. Each first locking portion 227 preferably includes an abutment wall 233 extending downward from the plate portion 225 and an elastic claw 234 corresponding to the abutment wall 233. The elastic claw 234 has a column portion 234A that extends downward from the plate portion 225 and opposes the abutment wall 233 with a gap therebetween, and a claw portion 234B that protrudes toward the abutment wall 233 from the lower end of the column portion 234A. Preferably, the abutment wall 233 and the column portion 234A clamp the first portion 207A from the left and right directions. Preferably, the lower surface of the plate portion 225 and the claw portion 234B clamp the first portion 207A from above and below.

Figure 17:
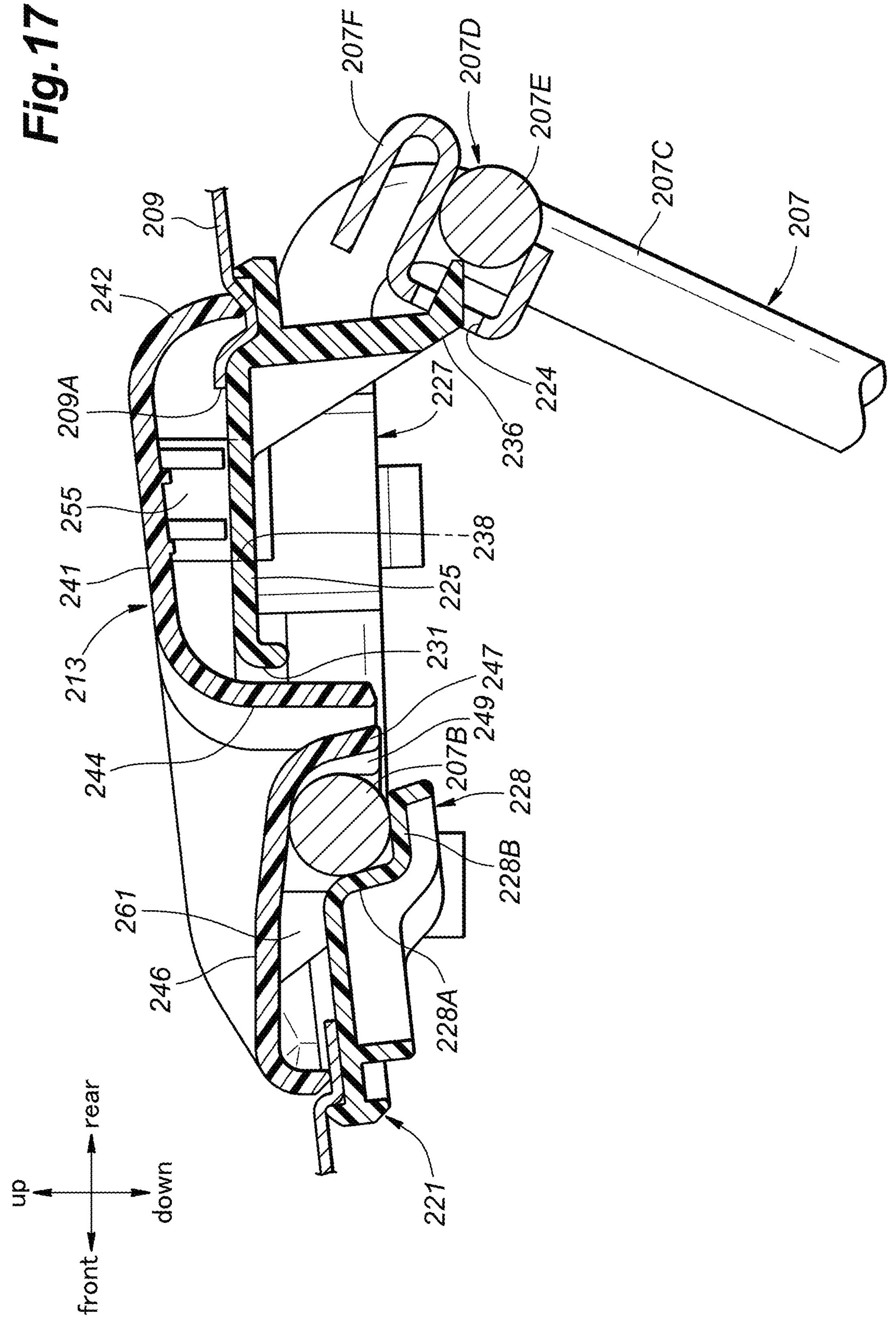
FIG. 17 is a sectional view of the coupling structure of the belt guide of the other modified embodiment (taken along line XIII-XIII of FIG. 13)

As shown in FIGS. 16 and 17, the second locking portions 228 protrude downward from the plate portion 225 and abut against the front end and lower end of the second portion 207B. In this embodiment, the left and right second locking portions 228 are provided at the front edge of the first belt hole 231. The left and right second locking portions 228 are spaced apart from each other in the lateral direction. Each second locking portion 228 includes a front wall portion 228A that extends downward from the edge of the first belt hole 231 and abuts against the front end of the second portion 207B, and a lower wall portion 228B that extends rearward from the lower end of the front wall portion 228A and abuts against the lower end of the second portion 207B. The rear end of each second locking portion 228 is positioned forward of the rear edge of the first belt hole 231.

The base member 221 has a third locking portion 236 that extends downward from the plate portion 225 and is locked by the locking hole 224. The third locking portion 236 extends downward from a rear part of the lower surface of the plate portion 225, and then bends and extends rearward. The third locking portion 236 is positioned laterally between the left and right first locking portions 227. The lower end of the third locking portion 236 projects into the locking hole 224 from the front. By locking the lower end of the third locking portion 236 in the locking hole 224, upward movement of the rear part of the base member 221 with respect to the seat frame 207 is restricted.

The base member 221 has positioning holes 238 formed in the plate portion 225 thereof. In this embodiment, a pair of positioning holes 238 are formed at the rear of the plate portion 225 on either side part thereof. Each positioning hole 238 is passed through the plate portion 225 in the thickness direction.

As shown in FIG. 17, the skin material 209 is positioned along the surface of the plate portion 225. A skin opening 209A corresponding to the first belt hole 231 is formed in the skin material 209. The skin opening 209A exposes the first belt hole 231 and the positioning holes 238 through the skin material 209. The edge of the skin opening 209A is positioned inward of the edge of the plate portion 225.

Figure 15:
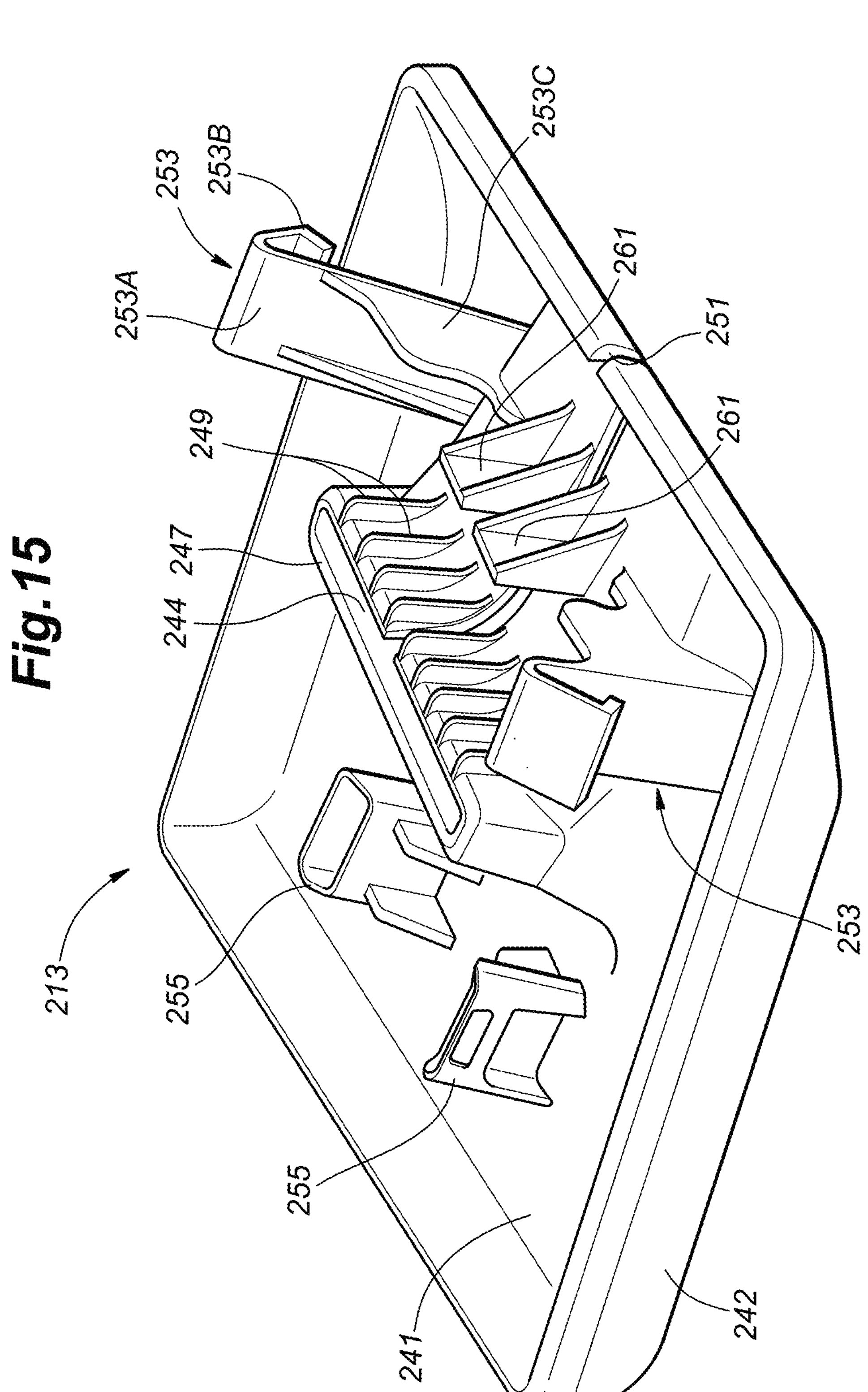
FIG. 15 is a perspective view of the belt guide of the other modified embodiment as viewed from a back side.

As shown in FIGS. 14 and 15, the belt guide 213 has a main body portion 241 opposing the plate portion 225. The main body portion 241 is formed in a plate shape and opposes the plate portion 225 from above with a gap defined therebetween. A vertical wall 242 that protrudes downward is provided on the edge of the main body portion 241. The vertical wall 242 extends along the edge of the main body portion 241. The lower end of the vertical wall 242 contacts the upper surface of the plate portion 225 with the skin material 209 interposed therebetween.

A second belt hole 244 through which the seat belt 211 is passed is formed in the main body portion 241. The second belt hole 244 penetrates the main body portion 241 in the thickness direction. The second belt hole 244 opposes the first belt hole 231 when viewed from above. The second belt hole 244 is elongated in the lateral direction. The second belt hole 244 is sized so as to prevent the tongue plate 216 to pass therethrough. The second belt hole 244 is formed smaller than the first belt hole 231. The second belt hole 244 overlaps with the first belt hole 231 when viewed from above. A guide recess 246 which is recessed downward is formed in a front part of the upper surface of the main body portion 241. The guide recess 246 extends from the front edge of the second belt hole 244 to the front edge of the main body portion 241.

As shown in FIGS. 15 and 17, the belt guide 213 has an edge wall 247 extending from the edge of the second belt hole 244 into the first belt hole 231. The edge wall 247 extends downward from the lower surface of the plate portion 225. The edge wall 247 extends along the edge of the second belt hole 244 and has a cylindrical shape. The inner space of the edge wall 247 is open from top to bottom and connected to the second belt hole 244. The edge wall 247 passes through the first belt hole 231, and the lower end of the edge wall 247 is disposed below the plate portion 225. The front and rear parts of the edge wall 247 are formed into flat plates that are parallel to each other.

The edge wall 247 is provided with a plurality of ribs 249. The ribs 249 are provided on the outer surface of the front part of the edge wall 247. Each rib 249 extends in the vertical direction along the front part of the edge wall 247 and projects forward. The ribs 249 are arranged at intervals in the lateral direction.

The main body portion 241 is provided with a slit 251 that extends from the second belt hole 244 to a side edge of the main body portion 241. The slit 251 reaches the front edge of the main body portion 241. Further, the slit 251 extends upward from the lower end of the front part of the edge wall 247, extends forward through the guide recess 246, and extends downward through the vertical wall 242 before reaching the lower end of the vertical wall 242. In other words, both ends of the slit 251 are open.

Figure 18:
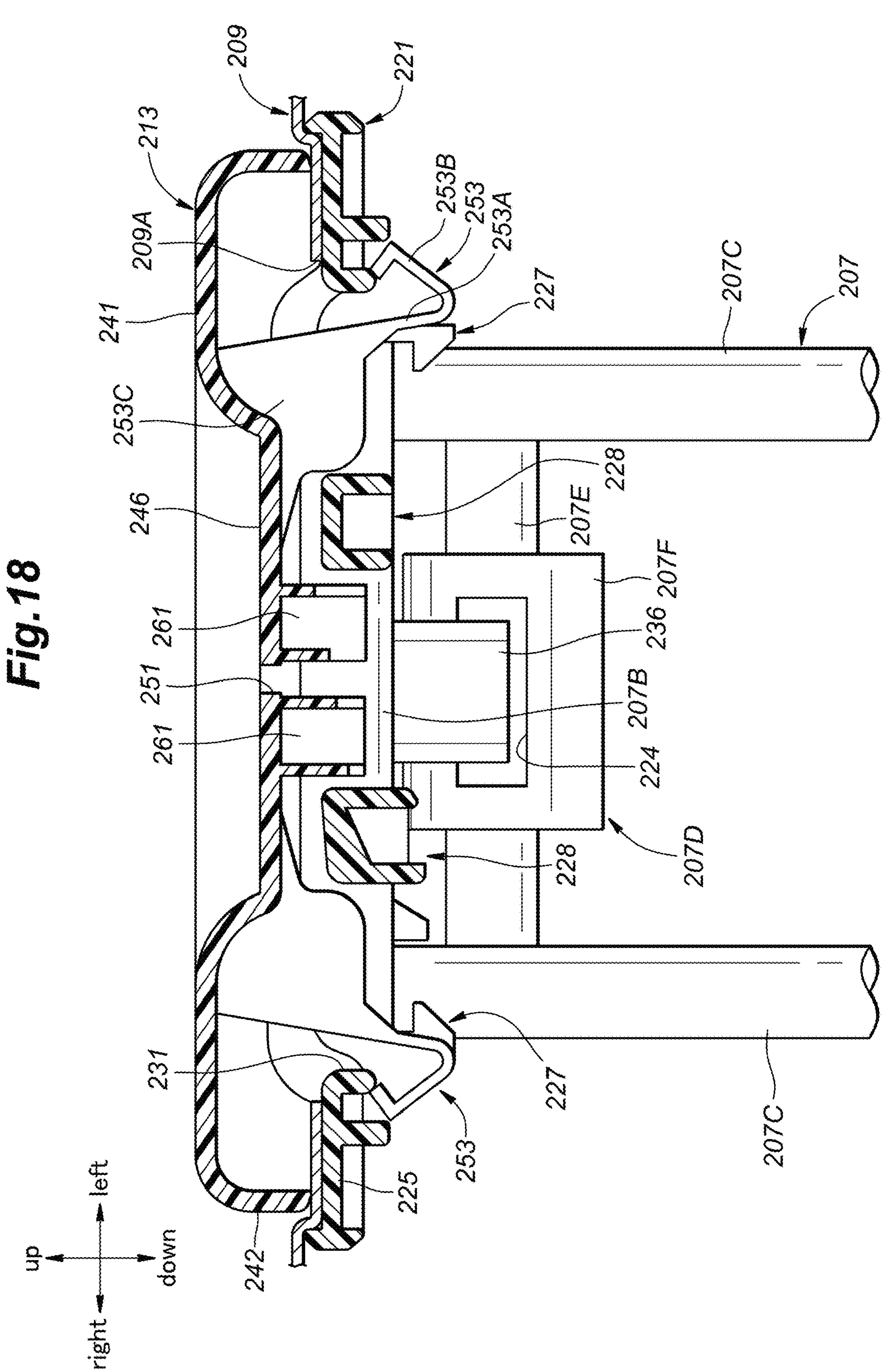
FIG. 18 is a sectional view of the coupling structure of the belt guide of the other modified embodiment (taken along line XIV-XIV of FIG. 13)

As shown in FIGS. 15 and 18, the belt guide 213 has a plurality of locking claws 253 that protrude downward from the main body portion 241 and are locked to the plate portion 225. In this embodiment, a pair of locking claws 253 are provided at a front part of the lower surface of the main body portion 241 on either side. The left locking claw 253, which is one of the locking claws 253, is locked to the left edge of the first belt hole 231. The other one of the locking claws 253, or the right locking claw 253, is locked to the right edge of the first belt hole 231. The left and right locking claws 253 are formed symmetrically with respect to each other. Each locking claw 253 is provided with an elastic piece 253A that extends downward from the lower surface of the plate portion 225 and passes through the first belt hole 231, a claw portion 253B that is formed at the lower end of the elastic piece 253A and locks on the edge of the first belt hole 231, and a reinforcing wall 253C that connects the elastic piece 253A to the plate portion 225. The elastic piece 253A is deflectable in the lateral direction. The reinforcing wall 253C adjusts the deformability of the elastic piece 253A. With respect to the fore and aft direction, each locking pawl 253 is positioned forward of the edge wall 247. Further, with respect to the lateral direction, the left and right locking claws 253 are positioned laterally outward of the edge wall 247.

As shown in FIGS. 15 and 19, the belt guide 213 is provided with positioning projections 255 that extend downward from the plate portion 225 and fit into the corresponding positioning holes 238. In this embodiment, a pair of positioning projections 255 are formed in a rear part of the main body portion 241.

By fitting the positioning projections 255 into the corresponding positioning holes 238, movement of the belt guide 213 with respect to the base member 221 in the fore and aft direction and lateral direction is restricted. In addition, each of the locking claws 253 is locked to the edge of the first belt hole 231, thereby restricting vertical movement of the belt guide 213 with respect to the base member 221. In this way, the belt guide 213 is fixed to the base member 221. Thus, the belt guide 213 can be connected to the base member 221 making use of the first belt hole 231.

As shown in FIG. 17, the second portion 207B is positioned between the left and right second locking portions 228 and the main body portion 241 in the vertical direction. Preferably, the second portion 207B is held between the left and right second locking portions 228 and the main body portion 241 with respect to the vertical direction. Further, the second portion 207B is positioned between the left and right second locking portions 228 and the edge wall 247 with respect to the fore and aft direction. Preferably, the second portion 207B is held between the second locking portion 228 and the ribs 249 with respect to the fore and aft direction. As a result, the front parts of the base member 221 and the belt guide 213 are fixedly supported with respect to the fore and aft direction and vertical direction relative to the second portion 207B. The ribs 249 ensure that the edge wall 247 and the second portion 207B of the seat frame 207 are in contact with each other. Further, the base member 221 and the belt guide 213 can be fixed to the second portion 207B without rattling.

As shown in FIGS. 15 and 17, the belt guide 213 preferably has a restricting wall 261 extending from the plate portion 225 into the first belt hole 231. Preferably, a pair of restricting walls 261 are provided on the left and right. The restricting walls 261 are preferably positioned on either side of the slit 251. The restricting walls 261 abut against the front end of the second portion 207B. Further, the restricting walls 261 and the ribs 249 preferably jointly clamp the second portion 207B from the front and rear directions. As a result, the front part of the belt guide 213 is fixedly supported in the fore and aft direction relative to the second portion 207B.

A part of the skin material 209 is clamped between the plate portion 225 and the belt guide 213. The edge of the skin opening 209A is positioned under the belt guide 213 and is thereby concealed from view.

The method for attaching the belt guide 213 to the seat 201 is described in the following. First, the base member 221 is attached to the seat frame 207. The base member 221 is positioned above the seat frame 207 such that the first belt hole 231 is positioned immediately above the second portion 207B, and the left and right first locking portions 227 are positioned immediately above the corresponding first portions 207A. In this state, by pushing the base member 221 downward, the left and right first portions 207A are locked to the corresponding first locking portions 227. This determines the position of the base member 221 relative to the seat frame 207 with respect to the vertical and lateral directions.

From this state, the base member 221 is pushed backward until the front wall portions 228A of the left and right second locking portions 228 come into contact with the front ends of the second portions 207B. As a result, the lower wall portions 228B of the left and right second locking portions 228 come into contact with the lower ends of the second portions 207B. Further, the tip of the third locking portion 236 projects into the locking hole 224. Thus, the fore and aft position of the belt guide 213 with respect to the base member 221 is maintained by the frictional force generated between the first locking portions 227 and the first portions 207A.

Next, the skin material 209 is placed over the seat frame 207 and the base member 221. At this time, the skin material 209 is placed on the plate portion 225 so that the skin opening 209A is aligned with the first belt hole 231 and the positioning hole 238.

Next, the seat belt 211 fitted with the tongue plate 216 is pulled out upward from below through the first belt hole 231. The seat belt 211 fitted with the tongue plate 216 is pulled out through between the second portion 207B and the rear edge of the first belt hole 231.

Next, the seat belt 211 is placed in the second belt hole 244 of the belt guide 213 through the slit 251. The tongue plate 216 cannot pass through the slit 251 and the second belt hole 244.

Next, the belt guide 213 is attached to the base member 221. At this time, the left and right positioning projections 255 fit into the corresponding positioning holes 238, and the left and right locking claws 253 are locked to the edge of the first belt hole 231. By fixing the belt guide 213 to the base member 221, the second portion 207B is clamped between the left and right second locking portions 228 and the main body portion 241 with respect to the vertical direction. In addition, with respect to the fore and aft direction, the second portion 207B is clamped between the second locking portions 228 and the ribs 249. In this manner, the belt guide 213 is attached to the seat frame 207.

According to the above embodiment, the belt guide 213 can be fixed to the seat frame 207 in the seat 201 without using any tool. By joining the belt guide 213 to the base member 221, the second portion 207B of the seat frame 207 is positioned between the base member 221 and the belt guide 213. This restricts the movement of the base member 221 and the belt guide 213 in the fore and aft direction and vertical direction relative to the seat frame 207. The lateral movement of the base member 221 and the belt guide 213 relative to the seat frame 207 is restricted by the engagement between the first locking portions 227 and the first portions 207A.

The first belt hole 231 is sized so as to allow the tongue plate 216 provided on the seat belt 211 to pass through, and the second belt hole 244 is sized so as not to allow the tongue plate 216 to pass through, so that the seat belt 211 to which the tongue plate 216 is fitted can be placed in the first belt hole 231 and the second belt hole 244. In addition, the tongue plate 216 is prevented from passing through the second belt hole 244 and being pulled into the seat.

The belt guide 213 is not limited to being provided at the top end of the seat back 204, but may also be provided on a side of the seat back 204, a side of the seat cushion 203, a side of a pillar that constitutes the passenger compartment, etc. In addition, the orientation of the belt guide 213 may be selected freely according to the orientation of the seat belt 211.

Figure 20:
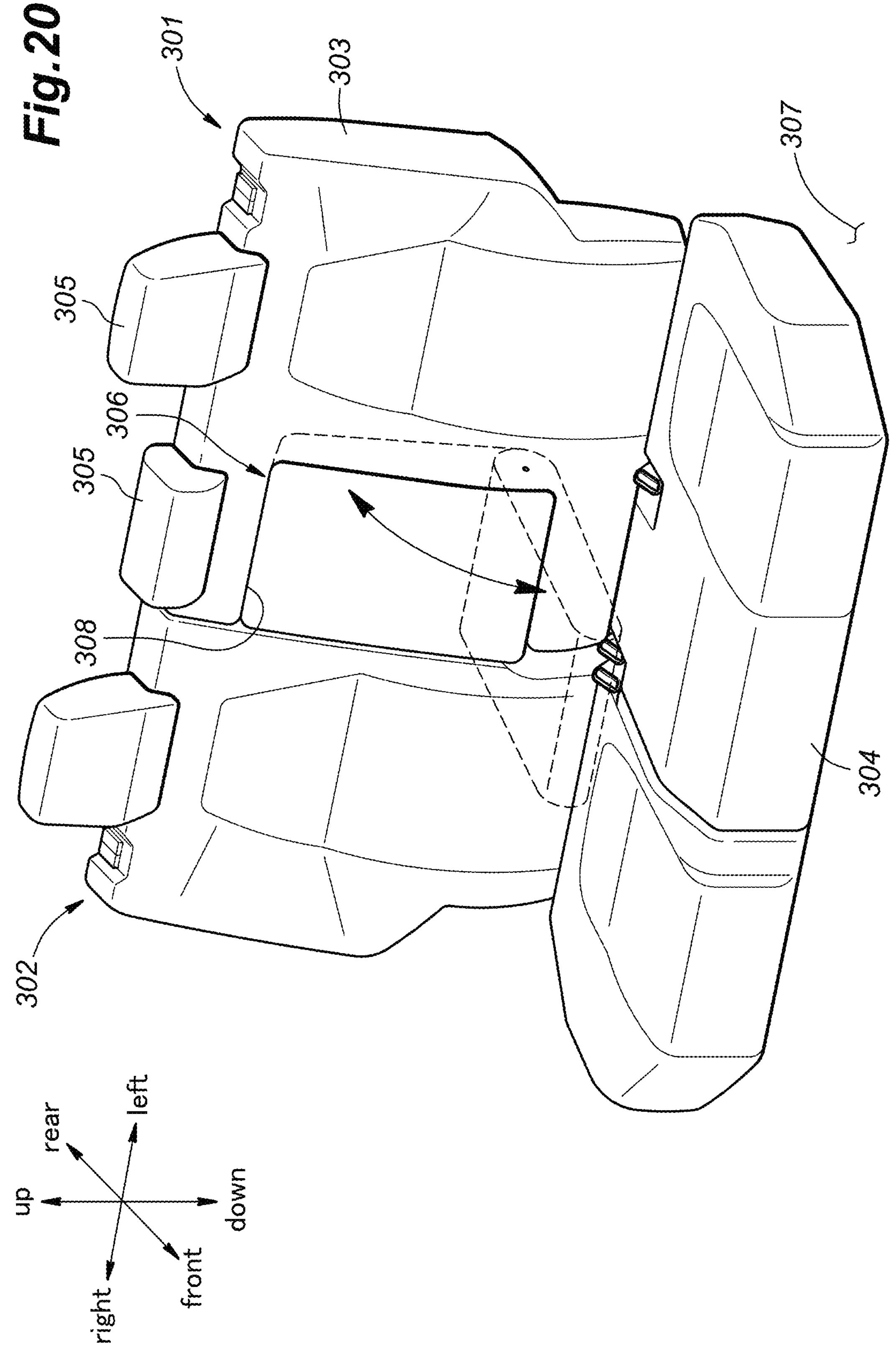
FIG. 20 is a perspective view of a seat according to yet another modified embodiment.

FIG. 20 shows another type of seat. As shown in FIG. 20, this rear seating arrangement of an automobile for seating three occupants includes a seat 301 providing a left and a middle seating space, and another seat 302 for providing a right seating space, and these two seats 301 and 302 are positioned laterally next to each other in a continuous manner. The two seats 301 and 302 are constructed independently from each other.

The seat 301 includes a seat back 303, a seat cushion 304, a headrest 305, and an armrest 306. The seat back 303 is supported on the floor 307 of the vehicle at its lower end so as to be rotatable about a laterally extending rotational axis. A front part of the part of the seat back for the central seating space is formed with a storage recess 308 for receiving the armrest 306. An armrest 306 is positioned in the storage recess 308, and is supported on the seat back 303 so as to be rotatable about a laterally extending rotational axis. The armrest 306 rotates between a use position in which the tip end thereof protrudes forward relative to a base end thereof supported by the seat back 303, and a storage position in which the tip end thereof is positioned above the base end thereof and received inside the storage recess 308. The seat cushion 304 is supported on the seat back 303 so as to be rotatable about a laterally extending rotation axis.

Figure 21:
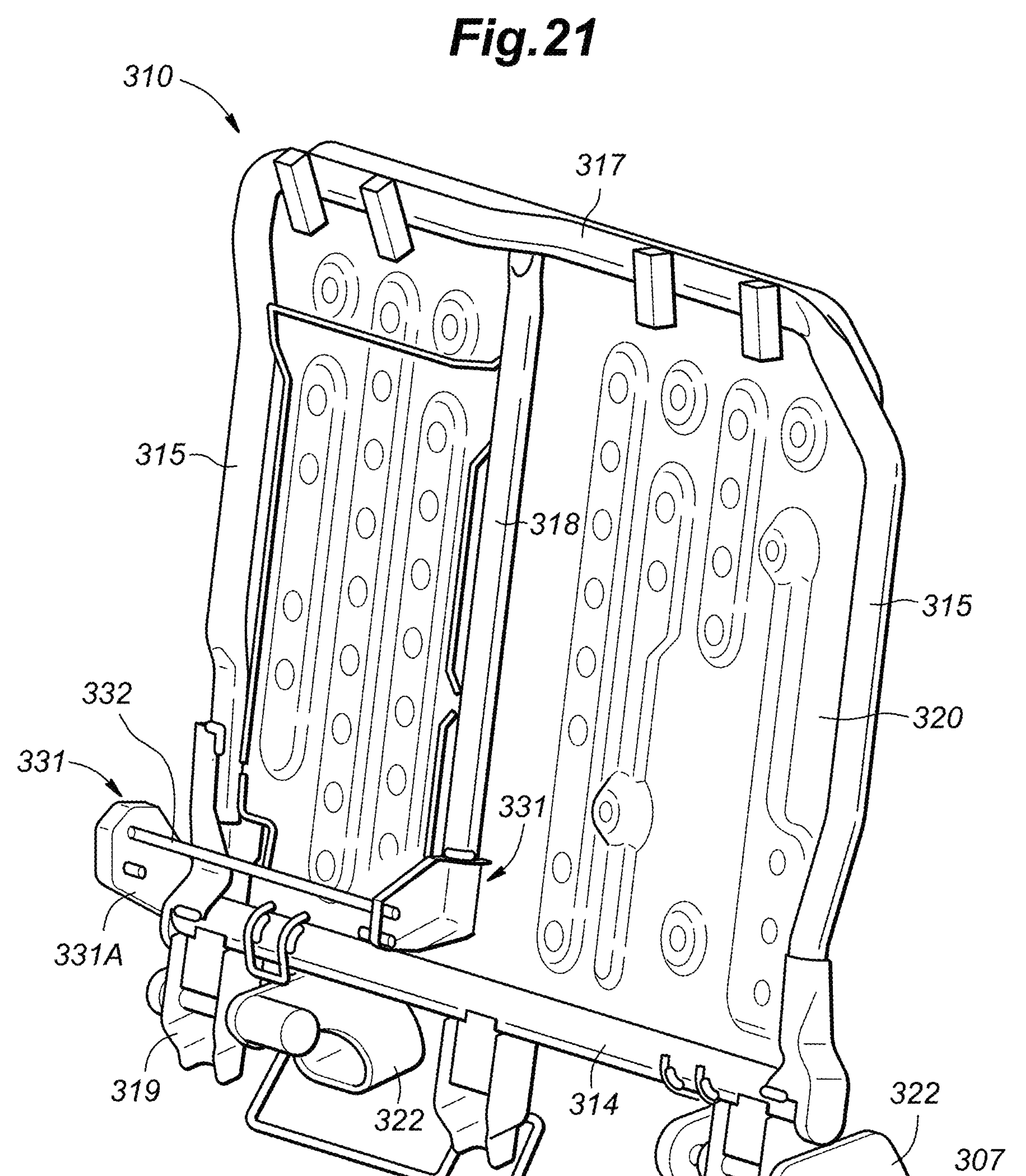
FIG. 21 is a perspective view of a seat back frame of the yet other modified embodiment.

As shown in FIG. 21, the seat back 303 is provided with a seat back frame 310. The seat back frame 310 is covered by a pad and a skin material. As shown in FIG. 21, the seat back frame 310 includes a lower member 314 extending laterally, a pair of side members 315 connected to the left and right ends of the lower member 314, respectively, and extending upward from the lower member 314, an upper member 317 extending laterally and connected to the upper ends of the left and right side members 315 at the left and right ends thereof, respectively, a center member 318 extending vertically and having an upper end connected to a laterally middle part of the upper member 317 and a lower end connected to a laterally middle part of the lower member 314, a pair of base members 319 connected to the left and right ends of the lower member 314, respectively, and protruding downward, and a pan frame 320 attached to the rear side of a frame structure formed by the lower member 314, the left and right side members 315, and the upper member 317. The left and right base members 319 are rotatably supported by corresponding legs 322 provided on the floor 307.

The right side member 315 and the center member 318 are each provided with a bracket 331, and the right and left brackets 331 jointly support the armrest 306. The left and right brackets 331 are formed by bending sheet metal. Each bracket 331 has a support portion 331A that protrudes forward from the side member 315 or the center member 318, as the case may be, and has a laterally facing major plane. The left and right support portions 331A are connected to each other by a laterally extending columnar shaft 332. The left and right support portions 331A are each provided with a columnar pin 334. The left and right pins 334 are positioned on a laterally extending axis. The left and right pins 334 extend from the left and right support portions 331A, respectively, toward each other. The left and right pins 334 are positioned below the shaft 332.

Figure 22:
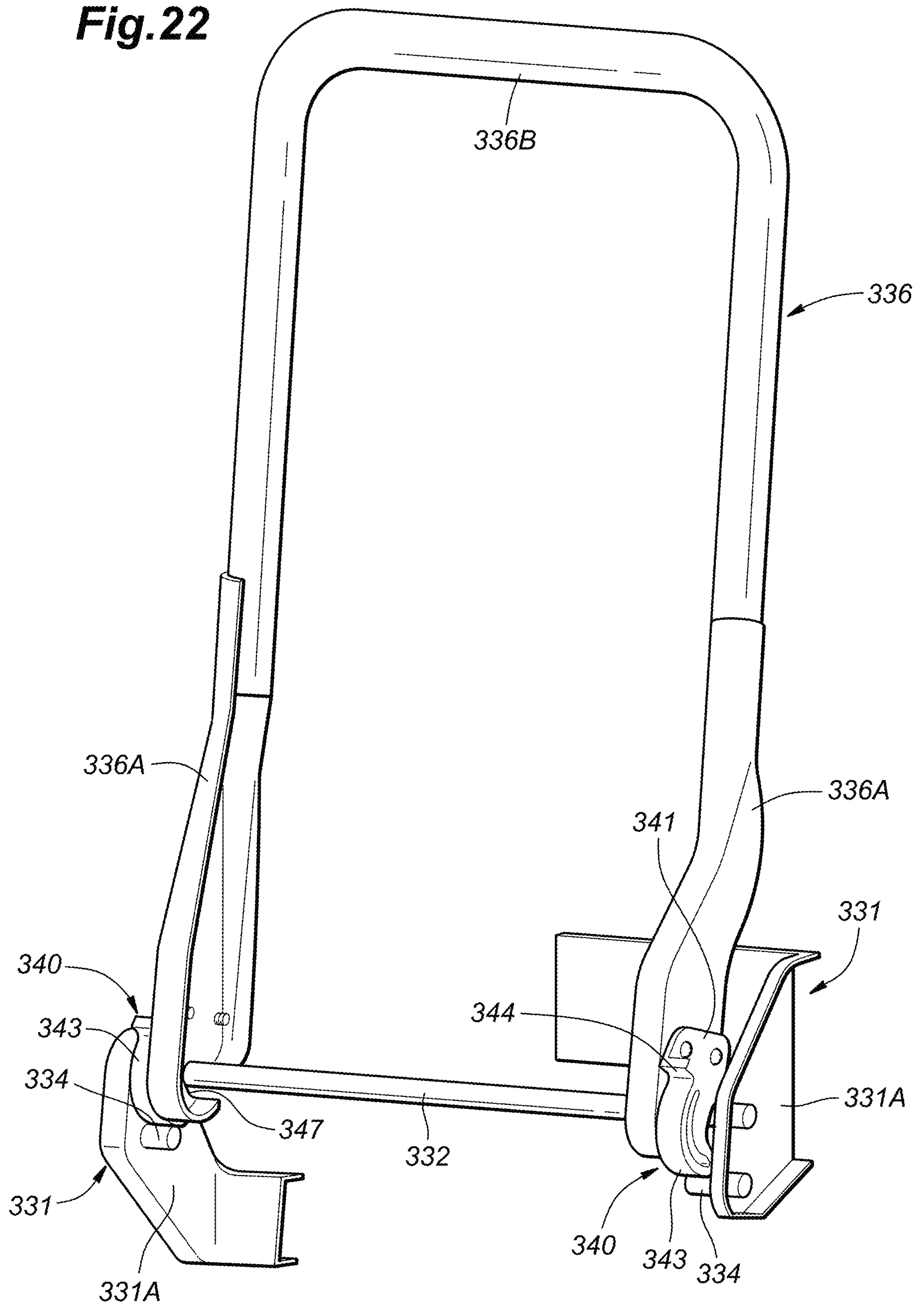
FIG. 22 is a perspective of a coupling structure of an arm rest of the yet other modified embodiment.

As shown in FIG. 22, the armrest 306 has an armrest frame 336. The armrest frame 336 is covered by padding and upholstery. The armrest frame 336 is provided with a pair of armrest side members 336A that form the left and right sides of the armrest 306, and a connecting member 336B that connects the tips of the left and right armrest side members 336A to each other.

A pair of hinge units 340 are connected to the base ends of the right and left armrest side members 336A, respectively. The left and right hinge units 340 have the same structure. As shown in FIG. 23, each hinge unit 340 is provided with a connecting portion 341 that is connected to the base end of the armrest side member 336A, a receiving groove 342 that receives the shaft 332, a sliding contact portion 343 that slides over the pin 334, and a stopper portion 344 that abuts against the pin 334 to maintain the armrest 306 in the use position.

The connecting portion 341 is fastened to the base end of the armrest side member 336A by fastening members such as bolts. The receiving groove 342 laterally penetrates the hinge unit 340. When the armrest 306 is in the storage position, the receiving groove 342 is preferably open toward the rear. The receiving groove 342 is provided with a pair of locking claws 346 for holding the shaft 332 in the receiving groove 342. The distance between the locking claws 346 is smaller than the diameter of the shaft 332. The locking claws 346 have resiliency. When the shaft 332 is inserted into the receiving groove 342, each locking claw 346 is elastically deformed, allowing the shaft 332 to pass into the receiving groove 342. A notch 347 is formed in a part of the armrest side member 336A so as to overlap with the receiving groove 342 when viewed from the lateral direction.

A sliding contact portion 343 is formed along the edge of the hinge unit 340 and extends in an arc shape. When the armrest 306 is in the storage position, the sliding contact portion 343 extends in an arcuate shape from the front of the shaft 332 downward. The sliding contact portion 343 is in sliding contact with the outer circumferential surface of the pin 334. When the armrest 306 rotates between the storage position and the use position, the sliding contact portion 343 is in sliding contact with the outer circumferential surface of the pin 334 and provides frictional resistance to the rotation of the armrest 306. The sliding contact portion 343 is formed with a hollowed-out portion 351 for adjusting the stiffness of the sliding contact portion 343. The hollowed-out portion 351 may be a hole penetrating the hinge unit 340 in the lateral direction or a recess that is recessed in the lateral direction. By adjusting the stiffness of the sliding contact portion 343, the frictional resistance provided to the rotation of the armrest 306 can be adjusted.

A stopper portion 344 is formed as a step provided on the base end side of the sliding contact portion 343. When the armrest 306 is in the use position, the stopper portion 344 abuts against the pin 334.

By pushing the base end of the armrest 306 toward the shaft 332, the shaft 332 is received in the receiving grooves 342 of the left and right hinge units 340, and the armrest 306 is rotatably supported by the shaft 332. When the armrest 306 is in the storage position, the worker can remove the armrest 306 from the shaft 332 by pulling the base end (lower end) of the armrest 306 forward.

Figure 24:
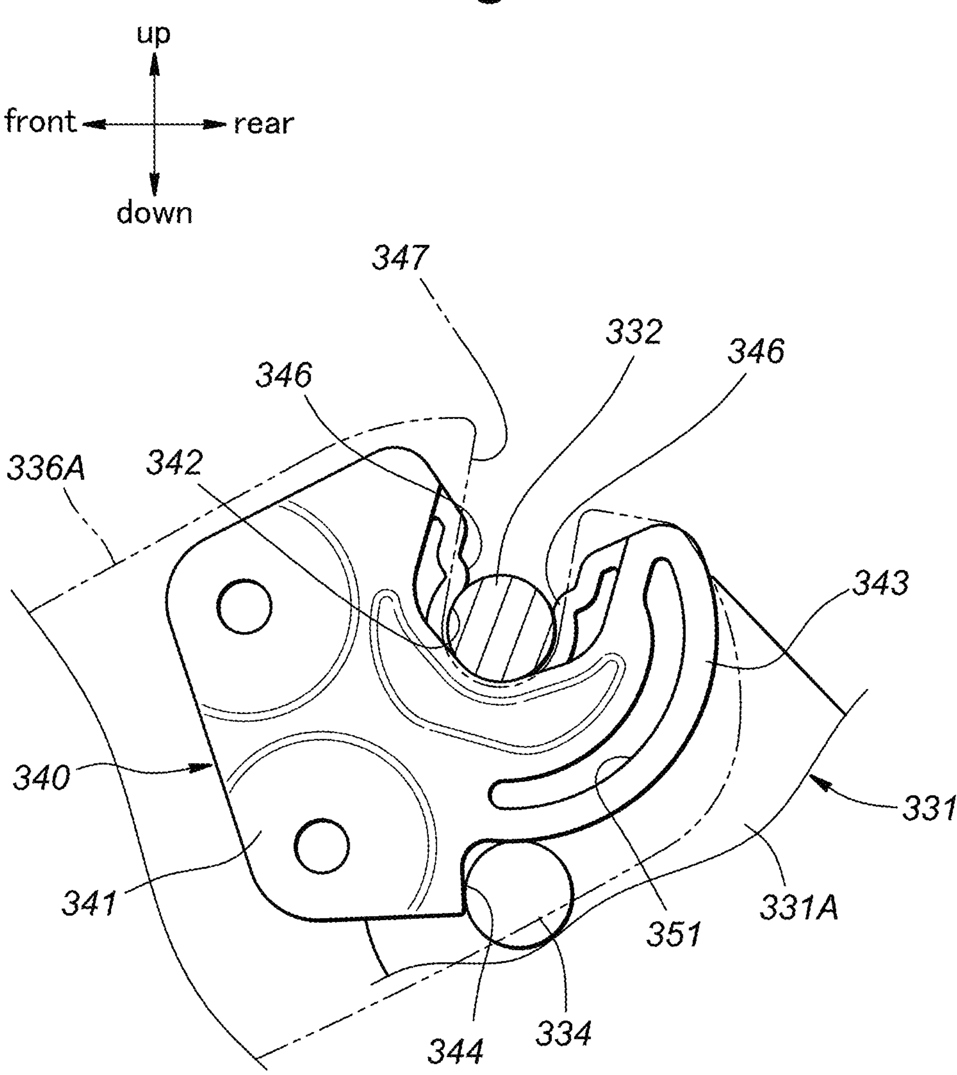
FIG. 24 is a side view of the hinge unit of the yet other modified embodiment when the arm rest is in a use position.

As shown in FIG. 24, when the armrest 306 is in the use position, the receiving grooves 342 open upward, and the hinge units 340 are supported from below by the pins 334. Therefore, even if a downward load is applied to the armrest 306, the shaft 332 is maintained inside the receiving groove 342, and the armrest 306 will not be dislodged from the shaft 332.

LIST OF REFERENCE NUMERALS

1: seat
3: seat cushion
4: seat back
7: seat frame
9: skin material
11: seat belt
13: belt guide
20: connecting member
22: first locking portion
22A: base end portion
22B: tip end portion
24: plate portion
26: first positioning hole
27: second positioning hole
31: leg portion
32: guide portion
41: first receiving hole
42: second receiving hole
43: recess
51: first projection
52: second projection
63: elastic claw
64: abutting piece
67: second locking portion

The invention claimed is:

1. A vehicle seat, comprising:

a seat frame;

a belt guide attached to the seat frame, and a coupling member coupling the belt guide to the seat frame, wherein the seat frame is provided with a first locking portion extending in a first direction, and the belt guide is provided with a first receiving hole extending in the first direction and through which the first locking portion passes, and a second receiving hole extending in a second direction orthogonal to the first direction and receiving a part of the coupling member, the coupling member received in the second receiving hole engaging the first locking portion passing through the first receiving hole.

2. The vehicle seat according to claim 1, wherein the seat frame is provided with a plate portion extending along a plane orthogonal to the first direction, a tip end portion of the first locking portion extends in a direction orthogonal to both the first direction and the second direction, and a surface of the tip end portion of the first locking portion facing the plate portion abuts against an abutting piece of the coupling member.

3. The vehicle seat according to claim 2, wherein the abutting piece extends in the second direction inside the second receiving hole.

4. The vehicle seat according to claim 2, wherein the coupling member is provided with an elastic claw that is deflectable in the first direction, and the belt guide is provided with a second locking portion that locks the elastic claw and restricts movement of the coupling member in the second direction.

5. The vehicle seat according to claim 4, wherein the second locking portion is formed inside the second receiving hole.

6. The vehicle seat according to claim 2, wherein the belt guide includes a leg portion extending along the plate portion, a guide portion connected to the leg portion and allowing a seat belt to pass therethrough, and a first projection protruding from the leg portion toward the plate portion, and the plate portion is provided with a first positioning hole for receiving the first projection.

7. The vehicle seat according to claim 6, wherein the first receiving hole and the second receiving hole are formed in the leg portion, and an outer surface of the coupling member and an outer surface of the leg portion jointly form a continuous outer surface.

8. The vehicle seat according to claim 6, wherein a second positioning hole is formed in the plate portion, the first locking portion is a plate piece that is cut and raised to form the second positioning hole, and the leg portion is provided with a plurality of second projections abutting against an edge of the second positioning hole.

9. The vehicle seat according to claim 8, wherein the second projections include a pair of second projections arranged at intervals along the second direction, and the first locking portion is positioned between the second projections along the second direction.

10. The vehicle seat according to claim 6, wherein a skin material is placed along a surface of the plate portion, a part of the skin material is clamped between the plate portion and the leg portion, and the first locking portion and the first projection penetrate the skin material.

* * * * *